US008346230B2

(12) United States Patent
Goodmon et al.

(10) Patent No.: US 8,346,230 B2
(45) Date of Patent: Jan. 1, 2013

(54) SYSTEM AND METHOD FOR DELIVERING GEOGRAPHICALLY RESTRICTED CONTENT, SUCH AS OVER-AIR BROADCAST PROGRAMMING, TO A RECIPIENT OVER A NETWORK, NAMELY THE INTERNET

(75) Inventors: James F. Goodmon, Raleigh, NC (US); James F. Goodmon, Jr., Durham, NC (US); John E. Clark, Angier, NC (US); Peter A. Sockett, Cary, NC (US); John L. Greene, Raleigh, NC (US)

(73) Assignee: Capitol Broadcasting Company, Inc., Raleigh, NC (US)

( * ) Notice: Subject to any disclaimer, the term of this patent is extended or adjusted under 35 U.S.C. 154(b) by 953 days.

(21) Appl. No.: 11/682,600

(22) Filed: Mar. 6, 2007

(65) Prior Publication Data

US 2008/0222705 A1 Sep. 11, 2008

(51) Int. Cl.
*H04L 29/08* (2006.01)
(52) U.S. Cl. .......................................... 455/414.3; 726/4
(58) Field of Classification Search .............. 455/414.3, 455/12.1; 726/4, 13; 342/367; 725/31
See application file for complete search history.

(56) References Cited

U.S. PATENT DOCUMENTS

| 6,147,642 | A | 11/2000 | Perry et al. |
| 6,252,547 | B1 * | 6/2001 | Perry et al. ..................... 342/367 |
| 6,714,759 | B2 | 3/2004 | Perry et al. |
| 6,785,904 | B1 | 8/2004 | Franken et al. |
| 6,832,070 | B1 | 12/2004 | Perry et al. |
| 6,917,328 | B2 | 7/2005 | Rabinowitz et al. |
| 7,028,323 | B2 | 4/2006 | Franken et al. |
| 7,620,390 | B2 * | 11/2009 | Vezza et al. ................. 455/414.1 |
| 7,671,797 | B1 * | 3/2010 | Herz et al. ..................... 342/359 |

(Continued)

FOREIGN PATENT DOCUMENTS

| WO | 0171676 A2 | 9/2001 |
| WO | 03019553 A1 | 3/2003 |

OTHER PUBLICATIONS

Kopitz, Dietmar et al., "The Radio Data System "RDS" in Europe and the Radio Broadcast Data System "RBDS" in the USA—What are the Differences and How Can Receivers Cope with Both Systems?," http://www.rds.org.uk/rdsfrdsrbds.html, Revised Jan. 5, 1993, 9 pages.

(Continued)

*Primary Examiner* — Charles Appiah
*Assistant Examiner* — Alexander Yi
(74) *Attorney, Agent, or Firm* — Withrow & Terranova, PLLC

(57) ABSTRACT

A system and method for delivering geographically restricted content, including but not limited to over-air broadcast programming, to a recipient over a computer network, namely the Internet. The content is only delivered over the computer network if the recipient's computer or network device requesting the content over the network is verified to be located in the geographically restricted area. A conventional tuner is employed by the recipient's computer to receive one or more over-air signals having a broadcast range deemed to be synonymous with the geographically restricted area for the requested content. If the tuner is able to receive such over-air signal(s), the requested content is delivered over the network to the recipient's computer. This is because the recipient is known to be physically located in the geographically restricted area by the ability of the tuner to receive the over-air signal(s).

75 Claims, 16 Drawing Sheets

U.S. PATENT DOCUMENTS

| | | | |
|---|---|---|---|
| 7,774,808 | B2 | 8/2010 | Jankins et al. |
| 7,801,538 | B2 | 9/2010 | Weiser et al. |
| 2001/0011008 | A1 | 8/2001 | Perry et al. |
| 2001/0027555 | A1 | 10/2001 | Franken et al. |
| 2002/0142750 | A1* | 10/2002 | Gill, III ............ 455/406 |
| 2003/0078035 | A1* | 4/2003 | Sheha et al. ............ 455/414 |
| 2003/0097654 | A1 | 5/2003 | Franken et al. |
| 2003/0121042 | A1 | 6/2003 | Franken et al. |
| 2003/0228869 | A1 | 12/2003 | Chow et al. |
| 2004/0068536 | A1* | 4/2004 | Demers et al. ............ 709/201 |
| 2004/0160946 | A1* | 8/2004 | Fowler ............ 370/352 |
| 2005/0013584 | A1* | 1/2005 | Takaoka et al. ............ 386/46 |
| 2005/0044274 | A1* | 2/2005 | Deming et al. ............ 709/246 |
| 2005/0163164 | A1* | 7/2005 | Cramer et al. ............ 370/486 |
| 2006/0064360 | A1 | 3/2006 | Piccionelli et al. |
| 2006/0271949 | A1 | 11/2006 | Perry et al. |
| 2007/0016922 | A1 | 1/2007 | Koch |
| 2007/0016932 | A1 | 1/2007 | Franken et al. |
| 2008/0077956 | A1* | 3/2008 | Morrison et al. ............ 725/38 |
| 2008/0152039 | A1* | 6/2008 | Shah et al. ............ 375/316 |
| 2008/0168487 | A1* | 7/2008 | Chow et al. ............ 725/31 |

OTHER PUBLICATIONS

Unknown, "Radio Data System," http://en.wikipedia.org/wiki/Radio_Data_System, Wikipedia, Printed Dec. 10, 2007, 5 pages.

Digital Audio Broadcasting Subcomittee, "In-Band/On-Channel Digital Radio Broadcasting Standard," NRSC-5-A, National Radio Systems Committee, http://www.nrscstandards.org, Sep. 2005, 44 pages.

Unknown, "The Nielsen Audio Video Encoder (NAVE) Questions and Answers," Nielsen Media Research, http://www.nielsenmedia.com/forclients/APMeter/file/NAVEQA.pdf, 4 pages.

Unknown, "Atsc Recommended Practice: Program and System Information Protocol Implementation Guidelines for Broadcasters," Advanced Television Systems Committee, Doc. A/69, http://www.atsc.org/standards/a_69.pdf, Jun. 25, 2002.

Allison, Arthur W., Nab, "PSIP 101: What You Need to Know," Broadcastengineering.com, Jun. 2001, 2 pages.

Wright, Scott, "RBDS versus RDS—What are the Differences and How Can Receivers Cope with Both Systems?," National Radio Systems Committee, Jan. 1998, 9 pages.

Unknown, "RDS Forum—Open Data Applications; Developments in Open Data Applications," http://www.nrscstandards.org, Printed Dec. 10, 2007, 6 pages.

Hern, Ted, "Getting with the Program; Tiny Startup Pushes FCC to Force Television Networks onto Online 'Cable'," Multichannel News, http://www.multichannel.com, Feb. 5, 2007, 5 pages.

Final Office Action for U.S. Appl. No. 13/093,069 mailed Aug. 8, 2012, 41 pages.

* cited by examiner

| Group Type | Description of Use |
|---|---|
| 0 A | Basic tuning and switching information only |
| 0 B | Basic tuning and switching information only |
| 1 A | Program Item Number and slow labeling codes only |
| 1 B | Program Item Number |
| 2 A | Radiotext only |
| 2 B | Radiotext only |
| 3 A | Applications Identification for ODA only |
| 3 B | Open Data Applications |
| 4 A | Clock-time and date only |
| 4 B | Open Data Applications |
| 5 A | Transparent Data Channels (32 channels) or ODA |
| 5 B | Transparent Data Channels (32 channels) or ODA |
| 6 A | In House applications or ODA |
| 6 B | In House applications or ODA |
| 7 A | Radio Paging or ODA |
| 7 B | Open Data Applications |
| 8 A | Traffic Message Channel or ODA |
| 8 B | Open Data Applications |
| 9 A | Emergency Warning System or ODA |
| 9 B | Open Data Applications |
| 10 A | Program Type Name |
| 10 B | Open Data Applications |
| 11 A | Open Data Applications |
| 11 B | Open Data Applications |
| 12 A | Open Data Applications |
| 12 B | Open Data Applications |
| 13 A | Enhanced Radio Paging or ODA |
| 13 B | Open Data Applications |
| 14 A | Enhanced Other Networks information only |
| 14 B | Enhanced Other Networks information only |
| 15 A | Undefined |
| 15 B | Fast switching information only |

RDS/RBDS DATA GROUPS

*FIG. 7*

ILLUSTRATION OF HOW VARIOUS PSIP TABLES CONTAIN INFORMATION ABOUT BROADCAST

SYSTEM AND METHOD FOR DELIVERING GEOGRAPHICALLY RESTRICTED CONTENT, SUCH AS OVER-AIR BROADCAST PROGRAMMING, TO A RECIPIENT OVER A NETWORK, NAMELY THE INTERNET

FIELD OF THE INVENTION

The present invention relates to a system and method for delivering geographically restricted content, including but not limited to over-air broadcast programming, to a recipient computing device over a computer network, namely the Internet.

BACKGROUND OF THE INVENTION

Television and radio broadcasting is regulated in the United States and abroad due to the limited frequencies available for transmission. As a result, any person or entity that wishes to operate a television or radio broadcast station in the United States must apply for and receive a government-issued license in order to reserve a transmission frequency for its broadcast signal. Broadcast licenses granted by the FCC provide a geographic scope or area that limits the permissible range of each station's broadcast signal. The broadcast station must configure its broadcast signal to limit the broadcast signal range to the geographic scope of the license. A recipient's tuner must typically be within the geographic scope of the broadcaster's license to properly receive the over-air broadcast signal from the local broadcast station.

From a technology standpoint, cable providers can retransmit local broadcast programming over a physical line such as coaxial cable having a known geographic reach or area. This method of controlling distribution of a cable signal enables the cable provider to meet the geographic restrictions on local broadcast programming. Satellite providers are able to retransmit broadcast signals to dedicated receivers pre-programmed with a particular customer billing address. In this way, technology is used to limit customer access to program within geographic restrictions in place on such local broadcast programming.

Today, consumers often receive digital content via the Internet rather than using tuners to receive over-air signals. Content and programming information such as national or local news, weather, financial information, sports information and entertainment programming can be obtained by visiting any number of websites. Songs and movies are commonly ordered and either downloaded or streamed over the Internet to a recipient's computer for playing or viewing. Currently a local broadcast station does not have available technology to supply over-air broadcasts over the Internet and restrict such Internet viewing to a limited geographic area. This is because Internet access is not geographically limiting like over-air reception, and therefore, an Internet user physically located in the local broadcast station's area of license cannot be distinguished from a recipient physically located outside such area.

SUMMARY OF THE INVENTION

The present invention is a system and method for delivering geographically restricted content, including but not limited to over-air broadcast programming content, to a recipient computing device over a computer network, namely the Internet. The content is only delivered over the computer network if the recipient's computer or network device requesting the content over the network is verified to be located in the geographically restricted area for the requested content. A conventional tuner is employed by the recipient's computer to receive one or more over-air signals having a broadcast range deemed to be synonymous with or sufficiently proximate to the geographically restricted area for the requested content. If the tuner is able to receive such over-air signal(s), the requested content is delivered over the network to the recipient's computer. This is because the recipient is known to be physically located in the geographically restricted area by the ability of the tuner to receive the over-air signal(s). If a recipient is not located in the geographically restricted area for the requested content, the tuner will not be able to receive the over-air signal(s) representative of the recipient being located in the geographically restricted area for the requested content. Thus, a recipient's computing device that is not able to receive the over-air signal confirming the recipient is within the geographically restricted area will not receive the requested content over the computer network.

One or more content servers are employed to distribute the geographically restricted content to a requesting recipient over the computer network. A broadcast station may actually provide the content server. In this regard, the broadcast station provides one or more servers coupled to a computer network to host requests for streaming and/or downloading the requested content to requesting recipients over the computer network. The server(s) may be accessible by Internet Protocol (IP) addressing. The distributed content may be over-air broadcast programming from a broadcast station, or any other type content, such as audio files and video presentations as examples. The content requested for delivery over the computer network may be the same content broadcasted by the broadcast station over the air within the geographic limitations of the broadcast station's FCC license. If permitted, the content is packaged by the content server into data packets and sent out over the computer network to the requesting recipient. Receiving over-air broadcast programming content over a computer network will not typically suffer from broadcast reception related issues, which may be caused by interference or less than optimal broadcast signal coverage from the broadcast station's antennas.

The recipient employs a computer or other network device coupled to the computer network to request access to the content from the content servers(s). The recipient's computer may employ a browser that accesses the content server(s) via a uniform resource location (URL) web address translated into the IP address of the content server. Information about over-air signals received by the tuner coupled to the recipient computer is used to determine whether or not the recipient is physically located in the area represented by the geographic restriction for the requested content.

The tuner associated with the recipient computer may be adapted to receiver over-air broadcast signals from a broadcast station as the particular type of over-air signal(s). The present invention and tuner are not limited to receiving an over-air broadcast signal(s) as the particular type of over-air signal(s) used to determine if a recipient is located in the geographically restricted area for the requested content. If the tuner is adapted to receiver over-air broadcast signal(s) as the method of determining if the recipient is located in the geographically restricted area for the requested content, the tuner may be a radio tuner (e.g. FM (i.e. 88-108 Mhz) or AM (i.e. 500-1500 kHz), a television signal tuner (e.g. UHF (i.e. 470 to 806 MHz), VHF (i.e. 54-72, MHz, 76-88 MHz, and 174-216 MHz)), or both, in one embodiment of the present invention. In one embodiment, "Radio Broadcasting Data Service" (RBDS) information is extracted from a received over-air FM radio broadcast signal to determine if the recipient computer is physically located within the geographically restricted area for the requested content. Station information Service" (SIS) data embedded in a high-definition (HD) radio broadcast signal may also be used to identify the broadcast station and determine if the recipient computer is physically located within the geographically restricted area for the requested content. In another embodiment, the tuner or recipient computer extracts "Program and System Information Protocol" (PSIP) information, and more specifically the transport stream identifier (TSID) information, or the broadcast station call letters (for digital television), identifying the broadcast station from an over-air television broadcast signal to determine if the recipient computer is physically located within the geographically restricted area for the requested content. The television broadcast signal may be an analog or digital signal. Using RBDS, SIS, or PSIP data to determine a broadcast station identification may be a preferred method to determine the physical location of the recipient computer, because this information is typically already included by the broadcast station in radio and television broadcast signals without having to employ modifications to existing broadcasting equipment. However, the broadcast station can also purposefully insert an analog or digital signal or flag in over-air broadcast signals that can be extracted by the tuner to identify the broadcasting station and thus the location of the recipient computer in lieu of using embedded RBDS, SIS, and/or PSIP information.

The tuner associated with the recipient computer may also or alternatively be adapted to receiver over-air signals having transmission frequencies outside AM/FM/UHF/VHF broadcast signal frequencies. For example, "Worldwide Interoperability for Microwave Access" (WiMAX) is a standard to enable the delivery of "last mile" wireless broadband access as an alternative to cable or DSL broadband access. WiMAX has a range of up to thirty miles with a typical cell radius of four to six miles. Either receipt of a WiMAX signal, or a special coding or signal embedded into a WiMAX signal, may be received over-air by a tuner associated with the recipient computer to determine if the recipient computer is located in the geographically restricted area for the requested content. Other examples include signals in the 700 MHz spectrum, which may be utilized to deliver content to mobile phones. The 700 MHZ spectrum includes signals that can be broadcast by television broadcast stations like UHF and VHF signals, but is a spectrum that may television broadcast stations have vacated or no longer use for programming broadcasts. The present invention is not limited to any particular type of over-air signal to determine if the recipient's computer is located in the geographically restricted area for the requested content.

The tuner may be embedded within a recipient computer, or provided in the form of a peripheral device coupled to the recipient computer. For example, the tuner may contain a universal serial bus (USB) connection that plugs into a USB port on the recipient computer. The tuner may be configured to constantly receive and provide information about receipt of over-air broadcasting signal(s) for verification of the recipient's physical location within the geographically restricted area of the requested content. Over-air signal criteria is provided to the tuner to determine which over-air signal(s) to "tune in to" consistent with the geographically restricted area of the requested content. Over-air information, based on receipt of information embedded in a tuned over-air signal, is used for verification of the recipient's physical location and may be constantly provided by the recipient's computer to the content server(s) as a condition for continued streaming of content to the recipient's computer.

Other optional methods may be employed to ensure a recipient is located in the geographically restricted area of the requested content. These methods include, but are not limited to, requiring a recipient to enter credit or debit card information for accessing and/or verification of the recipient's billing address, determining the recipient's location using a GPS receiver coupled to the recipient computer, and/or using reverse IP address lookup on the IP address assigned to the recipient computer.

The recipient's computer may access content, including but not limited to over-air broadcast programming, from the content server(s) using browser-based web services, or using an application programming interface (API) software application downloaded from the content server(s) to the recipient computer. The recipient may also be required to first establish a user account with the content server before geographically restricted content can be accessed over the network. The account information may include user identification and/or billing information. Identification and billing information may be used to bill the recipient for access to content over the network and/or to provide user specific advertising to fund, either wholly or partially, the business model and expenses of the broadcasting station providing the content and/or over-air broadcast programming over the computer network.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 7 is a table illustrating data groups present within RBDS data;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a system and method for delivering geographically restricted content, including but not limited to over-air broadcast programming content, to a recipient computing device over a computer network, namely the Internet. The content is only delivered over the computer network if the recipient's computer or network device requesting the content over the network is verified to be located in the geographically restricted area for the requested content. A conventional tuner is employed by the recipient's computer to receive one or more over-air signals having a broadcast range deemed to be synonymous with or sufficiently proximate to the geographically restricted area for the requested content. If the tuner is able to receive such over-air signal(s), the requested content is delivered over the network to the recipient's computer. This is because the recipient is known to be physically located in the geographically restricted area by the ability of the tuner to receive the over-air signal(s). If a recipient is not located in the geographically restricted area for the requested content, the tuner will not be able to receive the over-air signal(s) representative of the recipient being located in the geographically restricted area for the requested content. Thus, a recipient's computing device that is not able to receive the over-air signal confirming the recipient is within the geographically restricted area will not receive the requested content over the computer network.

The geographically restricted area for the requested content may be a "Designated Market Area" (DMA) for the content. In other words, the requested content may have a DMA by regulation, geographic restrictions in accordance with compulsory license restrictions, and/or geographic restrictions according to rights content owners. The geographically restricted area may also be called or known as a "signal area." The term "geographically restricted area" is used throughout this application to include, but not limited to, a DMA or a signal area.

Broadcast Content Network Delivery System

Figure 1:
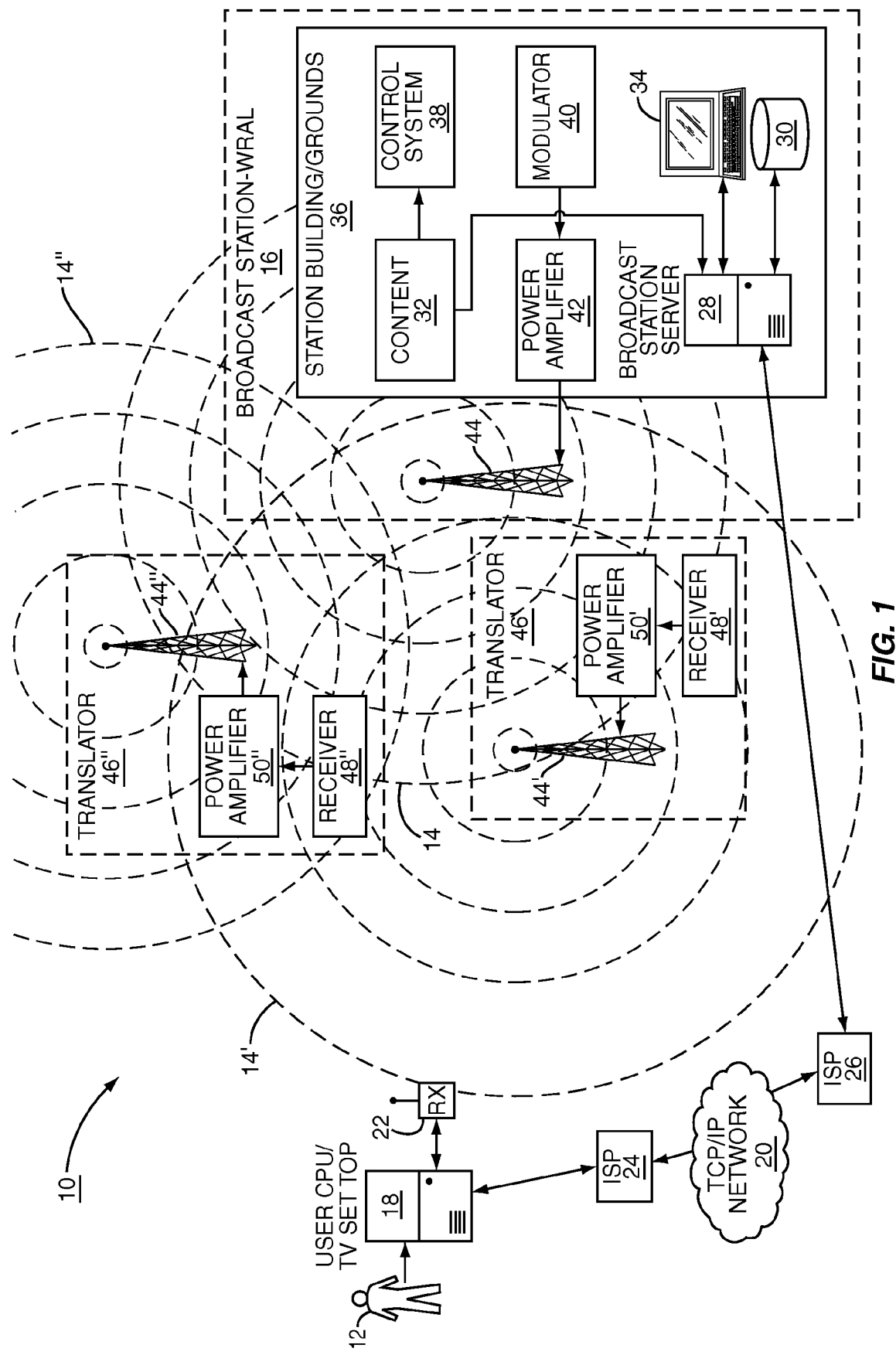
FIG. 1 is an illustration of a broadcast content network delivery system in accordance with one embodiment of the present invention.

FIG. 1 illustrates a broadcast content network delivery system 10 for an example of one embodiment of the present invention. In this embodiment, the content server(s) is provided by a broadcast station, and the over-air signal(s) received is an over-air broadcast signal(s). Receipt of the over-air broadcast signal(s) is used to determine if the recipient is in the geographically restricted area of the requested content is an over-air broadcast signal. Again, the present invention is not limited to the content being provided by a broadcast station, the broadcast station providing the content server(s), or the over-air signal(s) being an over-air broadcast signal(s). A broadcast station providing the content server, and an over-air broadcast signal being used to determine if the recipient is within the geographically restricted area for the requested content, are simply variations or specific examples for possible embodiments of the present invention.

A recipient 12, also called a "user," can remotely request content, including but not limited to an over-air broadcast signal 14 containing programming, via a communication/computer network 20, such as the Internet, from a broadcast station 16. The broadcast station 16 may be any type of broadcast station that broadcasts over-air signals, including but not limited to FM radio and television. The recipient 12 employs a networked computing device 18, such as but not limited to a personal computer, a user computer, and a television set top box, to request content. The user 12 controls the computing device 18 to request content over the computer network 20. In a preferred embodiment, the networked computer device 18 is a user personal computer 18, also referred to as "user computer" 18, and the computer network 20 is the Internet, which may be a TCP/IP-based network. The user computer 18 may also take the form of a mobile device, a cellular phone, a personal digital assistant, (PDA), and a personal messaging device (PMP) as other examples. The network 20 may be a remote communication link or any type of network, and may include any type of communication protocol, including but not limited to telephone dial-up, wireless, digital subscribe line (DSL), cable modem, etc. The user computer 18 employs TCP/IP-based communications to send and receive messages over the network 20.

The user computer 18 either includes a local tuner 22 to receive over-air broadcast signals 14. The tuner 22 is either internal to the user computer 18 or coupled via an external connection to the user computer 18. When the user 12 requests network access to geographically restricted content from the broadcast station 16, the user computer 18 establishes a network connection to the network 20 via an Internet Service Provider (ISP) 24. The user computer 18 communicates data packet messages using a IP address established for a broadcast station server 28 as the destination address. The ISP 24 communicates data packet messages from the user computer 18 over the network 20 to an ISP 26 used by the broadcast station 16, which is turn relays the messages to one or more content or broadcast station servers 28 "sitting" on the broadcast station's 16 IP address. The broadcast station server 28 establishes connections or sessions, using services such as web services or an application program interface (API) software, with user computers 18 to receive requests and provide access to content provided by the broadcast station 16, including but not limited to over-air programming. The broadcast station server(s) 28 is adapted to provide content-based programming and/or services to the user 12, as will be discussed throughout this application. This content may be streamed from a delivery network, or may be accessed from a memory database if the content was previously recorded and stored.

Note that the present invention is not limited to broadcast programming content in particular. The present invention may be employed to distribute other types of content, including but not limited to audio programming, songs, video programming, and video presentations, as examples. Further note that the present invention is not limited to the content server 28 being provided by a broadcast station 16. The content server 28 could include a corporate server, an audio server, a video server, an audio/video server, and a music server as other examples. The computer network 20 is not limited to a TCP/IP-based network. The computer network 20 may be a content delivery network, a dedicated line network, a public network, a private network, a corporate network or a public switched telephone network (PSTN), as examples.

In the preferred embodiment, the broadcast station server 28 is coupled to over-air programming content 32 transmitted over-air by the broadcast station 16. In this manner, the broadcast station server 28 can either store the over-air programming content 32 in the database 30 to provide to the user 12 at a later time, or provide streaming of over-air broadcast programming content 32 in real-time to the user computer 18 over the network 20. The broadcast station server 28 can be programmed, via a local terminal 34, by broadcast station personnel to set various options and features regarding performance and delivery options for providing content to user computers 18 over the network 20.

Prior to the present invention, the broadcast station 16 typically only communicated over-air programming content 32 to a control system 38. The control system 38 passed the content 32 to a modulator 40 to modulate the content 32 onto a carrier signal having the desired frequency to form a modulated broadcast signal. The modulated broadcast signal is amplified by a power amplifier 42. The amplified over-air broadcast signal 14 is communicated to an antenna tower 44 that broadcasts the amplified over-air broadcast signal 14 over-air in the vicinity of the broadcast station 16 according to the power output levels of the power amplifier 42 and the antenna tower 44 design. For some broadcast stations, where obstructions such as mountains may be located in the broadcast area, one or more translators 46, which include receivers 48 for receiving the over-air broadcast signal 14 and power amplifiers 50 for amplifying the received over-air broadcast signal 14, may be employed to carry the over-air broadcast signal 14 further out from the broadcast station 16 according to the geographically restricted area permitted under the broadcast station's FCC license.

Note that translators 46 are separately licensed by the FCC and thus carry their own unique identifier. This unique identifier can still be employed to determine if the user computer 18 is located in the geographically restricted area for the required content. For the remainder of this application, reference to identifying the broadcast station 16 is used to either refer to identification of the broadcast station 16, or the identifier of the translator 46, without distinction. Both are included methods of the present invention.

With the present invention, a user 12 can also receive this same over-air programming content 32 broadcast by the broadcast station 16, over the computer network 20 in addition to receiving the programming content 32 by over-air reception via the over-air broadcast signal 14. The tuner 22 is coupled to the user computer 18 and receives the over-air broadcast signal 14. The over-air broadcast signal 14 contains information that identifies the broadcast station 16 transmitting the over-air broadcast signal 14. Thus, the area where the tuner 22 and user computer 18 are physically located can be determined by identifying the broadcast station 16. If the tuner 22 can receive the over-air broadcast signal 14, this is an indication that the tuner 22 and the user computer 18 are geographically located in the broadcast range of the broadcast station 16. In response, the broadcast station server 28 authorizes the over-air broadcast programming content 32 to be provided over the network 20 to the user computer 18.

Because the broadcast range of the broadcast station 16 is controlled to be within a designated geographic licensing range permitted by the FCC, the tuner 22, by its receipt of the over-air broadcast signal 14, and the user computer 18 are likewise known to be in the licensing range of the broadcast station 16. The user computer 18 is permitted to receive over-air broadcast programming content 32 from the broadcast station 16 in this instance. Receipt of over-air broadcast programming content 32 via the computer network 20 may be more desirable. For example, poor signal reception, which may be caused by interference or less than optimal broadcast signal coverage from the broadcast station's antennas 44, may prevent less than optimal reception using a traditional tuner. Receiving over-air broadcast programming content 32 over the computer network 20 will not suffer from broadcast reception related issues if sufficient bandwidth exists on the computer network 20.

Note the broadcast station 16 and broadcast station server 28 embodiment illustrated in FIG. 1 is an exemplary embodiment. The present invention is applicable to any content server that desires to communicate geographically restricted content over a computer network. The content may be broadcast programming or any other type of content or programming.

Figure 2:
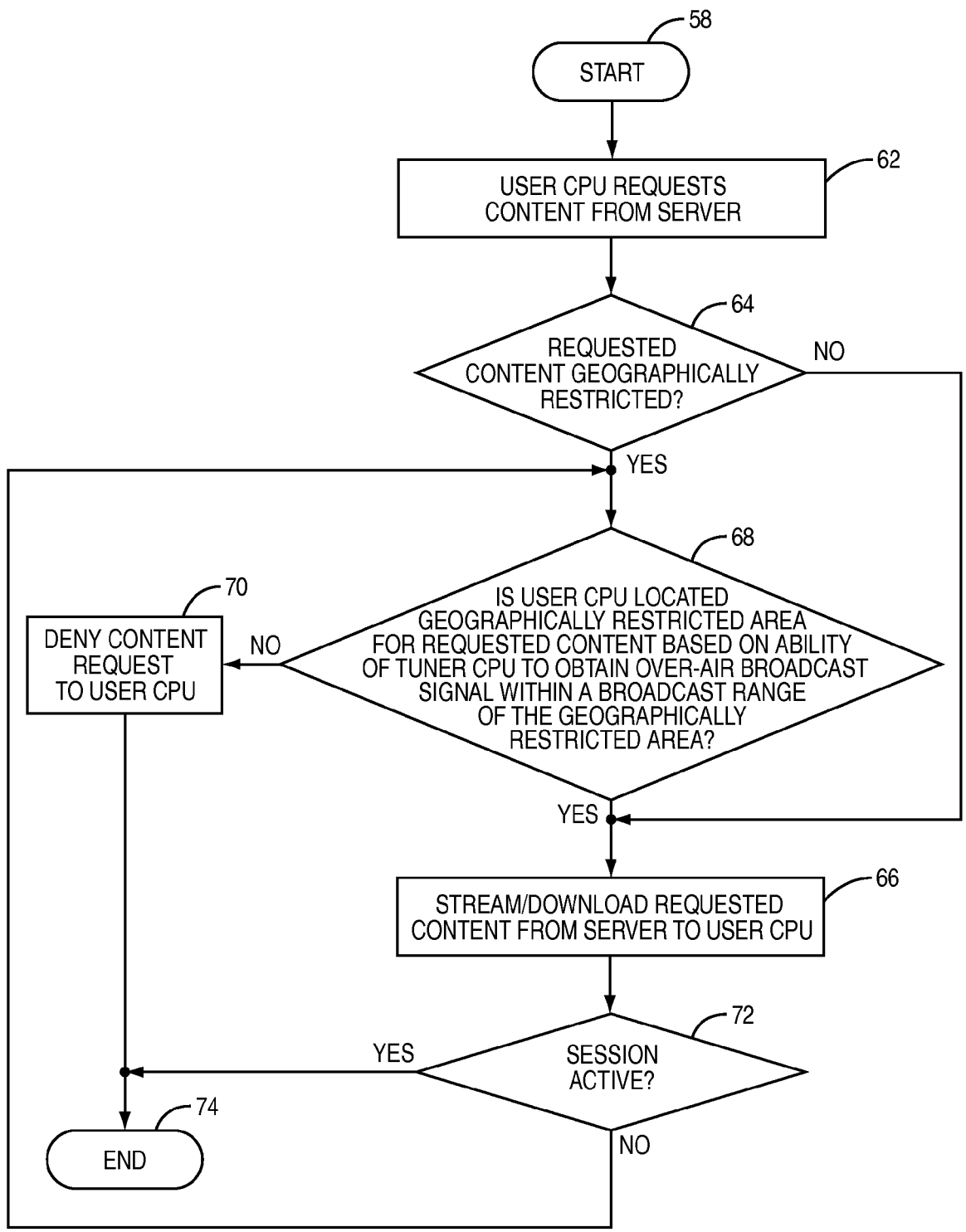
FIG. 2 is a flowchart illustrating verification that a recipient is located in the geographically restricted area of the requested content as a condition of receiving content over a network.

FIG. 2 is a flowchart illustrating the high level operation of the present invention. That is, verification of the user's 12 geographic location as a condition of receiving geographically restricted content from the broadcast station 16 over the network 20. The content may be over-air broadcast programming content 32 or other programming content. The process starts (step 60), and the user 12 directs the user computer 18 to request content from the broadcast station server 28 (step 62). The content may be geographically restricted by the broadcast station 16 and/or by its FCC license. The user computer 18 sends a data packet message to the broadcast station server 28 using the URL address of the broadcast station server 28. The broadcast station server 28 receives the request over the network 20 and determines if the requested content is geographically restricted (decision 64). If not, the broadcast station server 28 permits the downloading or streaming of the content over the network 20 to the user computer 18 (step 66).

If the requested content is geographically restricted, it is determined if the user computer 18 is located in the geographically restricted area for the requested content (decision 68). This is determined based on the ability of the user computer 18, employing the tuner 22, to receive an over-air broadcast signal 14 transmitted within the geographically restricted area. If the user computer 18 is not located in the geographically restricted area for the requested content, access is denied (step 70), and the process ends (step 74). If the user computer 18 is located in the geographically restricted area for the requested content, the broadcast station server 28 downloads or streams the requested content over the computer network 20 to the user computer 18 (step 66) until the request is fully performed and/or the session established by the user computer 18 is no longer active (decision 72).

The remainder of the description of this application explains the various methods by which the user computer 18 and broadcast station 16 interact to access geographically restricted content from the broadcast station 16 over the network 20. The content may be over-air broadcast programming content 32 broadcast by the broadcast station 16 as the over-air broadcast signal 14, or other content generated either locally at the broadcast station 16 or retrieved from external sources. Various methods may be employed to analyze over-air broadcast signals 14 received by the tuner 22 to determine the physical location of the tuner 22 and thus the user computer 18. Additional methods may be employed in addition to analyzing over-air broadcast signal(s) 14 received by the tuner 22 to ensure that the user 12 and the user computer 18 are physically located in the geographically restricted area of the broadcast station's 16 license from which the requested geographically restricted content is obtained over the network 20, as opposed to over-air reception.

Figure 3:
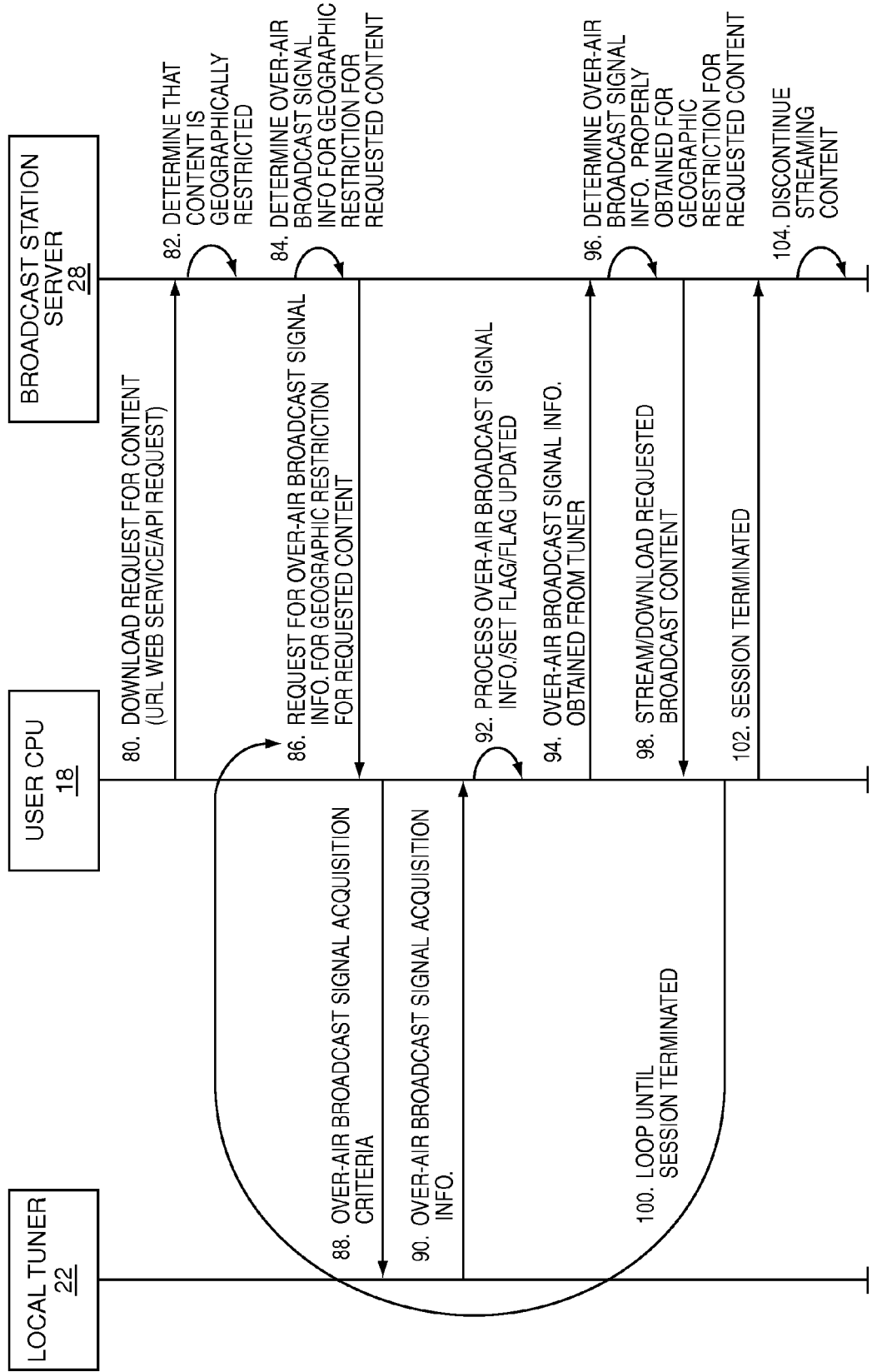
FIG. 3 is a flow diagram illustrating communications between a receiver, a local tuner, and a broadcast station content server, for delivery of content over a network, wherein the broadcast station server initially provides the over-air signal acquisition criteria to be acquired by the tuner for verification that the recipient is physically located within the geographically restricted area for the requested content.

FIG. 3 is a flow diagram illustrating more detailed communications between the user computer 18, the tuner 22, and the broadcast station server 28, for delivery of content over the network 20. In this embodiment, the broadcast station server 28 initially provides over-air broadcast signal acquisition criteria. The over-air broadcast signal acquisition criteria are instructions for the tuner 22 to receive one or certain over-air broadcast signal(s) 14 deemed to be synonymous with the area geographic restriction for the requested content. The tuner 22 provides over-air broadcast signal acquisition information in response to attempting to tune in the over-air broadcast signal(s) 14 according to the instructions provided in the over-air broadcast signal acquisition criteria. If the tuner 22 successful receives the over-air broadcast signal(s) 14 according to the over-air broadcast signal acquisition criteria, the user 12 and the user computer 18 are verified as being physically located in the geographically restricted area for the requested content. This verification is required for the broadcast station server 28 to provide the content to the user computer 18 over the network 20.

The user computer 18 first makes a download request for the programming content to the broadcast station server 28 over the network 20, typically using either web-based services or API software previously downloaded to the user computer 18, from the broadcast station server 28 (step 80). The broadcast station server 28 determines whether the requested content is geographically restricted (step 82). If so, the broadcast station server 28 retrieves the over-air broadcast signal acquisition criteria from the database 30, which is information about one or more over-air broadcast signals 14 to be acquired by the tuner 22 having the same or equivalent broadcast range as the geographically restricted area for the requested content (step 84). The over-air broadcast signal acquisition criteria is provided to the user computer 18, so that tuner 22 can be controlled to tune in to the designated over-air broadcast signal(s) 14 to determine if the user computer 18 is physically located in the licensing area of the requested programming content (step 86). Note that the over-air broadcast signal acquisition criteria does not have to include the same broadcast signal that carries the requested content; it may or may not.

Next, the user computer 18 communicates an over-air broadcast acquisition request to the tuner 22 using the over-air broadcast signal acquisition criteria received from the broadcast station server 28 (step 88). The tuner 22 returns over-air broadcast signal acquisition information back to the user computer 18 indicating whether the over-air broadcast signal(s) 14 provided by the broadcast station server 28 in the over-air broadcast acquisition criteria could be accessed (step 90). The user computer 18 processes over-air broadcast signal acquisition information received from the tuner 22 (step 92). A flag within the user computer 18 may be set or updated to indicate successful reception of the over-air broadcast signal 14 or identifying information embedded therein by the tuner 22 to prove the user computer 18 is within the geographically restricted area for the requested content. This is because the system may use information embedded within the over-air broadcast signal 14 received by the tuner 22 rather than reception of the signal 14 itself. Various methods of obtaining embedded information within the over-air broadcast signal 14 can be used to provide identifying information to determine the geographic location of the tuner 22 and thus the user computer 18, and will be discussed in more detail below.

The over-air broadcast signal acquisition information received from the tuner 22 is communicated to the broadcast station server 28 for processing (step 94). The broadcast station server 28 determines if the over-air broadcast acquisition information was obtained for the geographically restricted area for the requested content (step 96). If so, the requested content is downloaded or streamed over the network 20 to the user computer 18 (step 98). From there, the process iterates by repeating steps 88 through 98 to continue receiving over-air broadcast acquisition information from the tuner 22, and providing this information to the broadcast station server 28 as a condition of continued receipt of requested content. This continues until the user computer's 18 session with the broadcast station server 28 is terminated (steps 102, 104).

Figure 4:
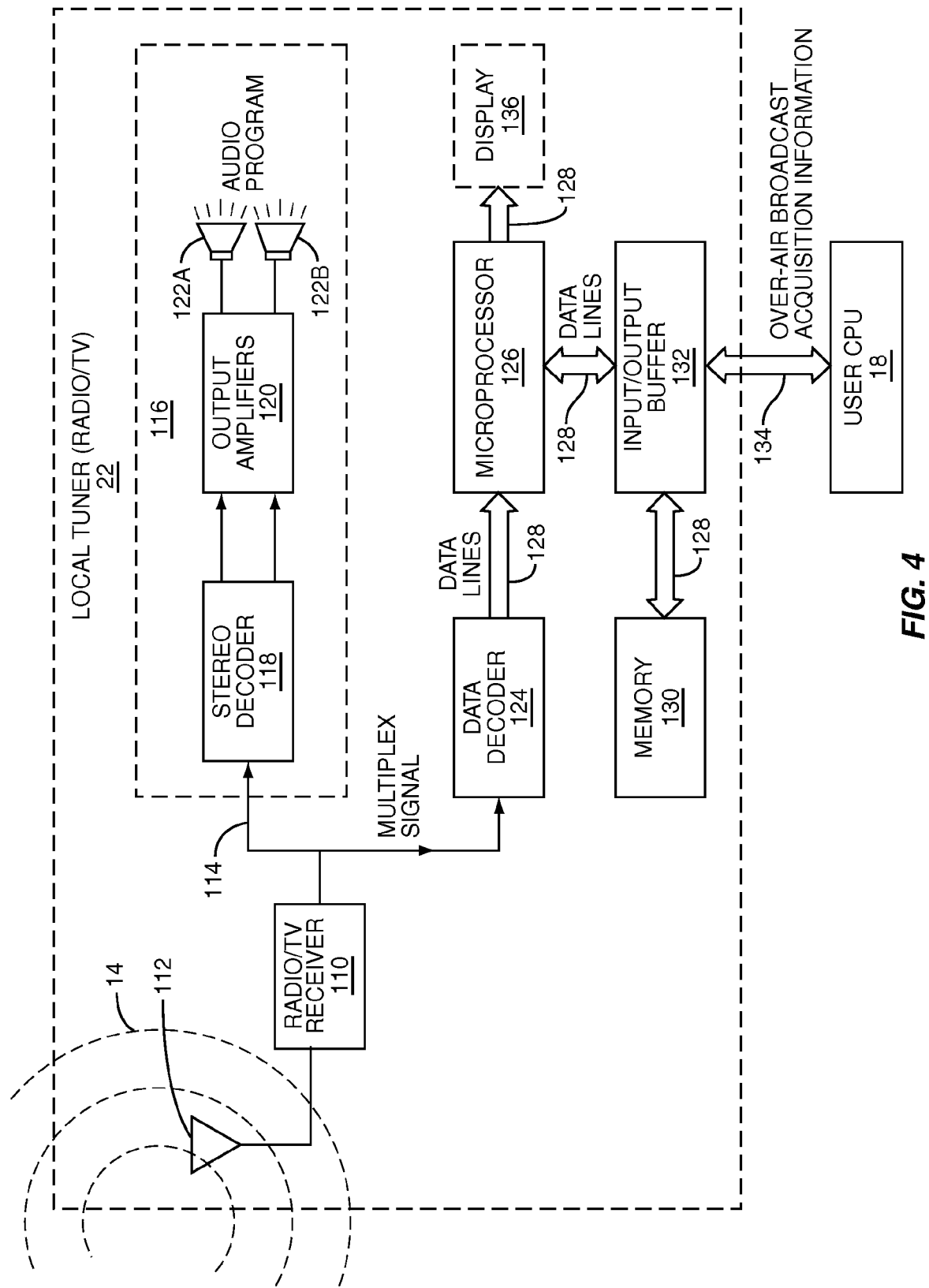
FIG. 4 is a schematic of a typical tuner for receiving radio (i.e. AM, FM) and/or television (i.e. UHF, VHF) broadcasts signals as one embodiment of a received over-air signal to verify if a recipient is located within the geographically restricted area of the requested content.

FIG. 4 illustrates one embodiment of a local tuner 22 that may be employed to receive over-air broadcast signals 14 as a method of obtaining identifying information about the broadcaster sufficient to determine if the user computer's 18 is located in a geographically restricted area for the requested content. The tuner 22 may be an AM, FM, UHF, or VHF tuner as examples, or any combination of such. The tuner 22 includes a receiver 110 that is coupled to an antenna 112 to receive the over-air broadcast signal 14. The received signal 14 is a multiplexed signal containing digital data and the programming content within the subcarrier frequency. The received signal is split into two paths. If the signal is to be viewed or is a stereo audio signal for example, the signal is decoded using a stereo decoder 118 and provided to output amplifiers 120 to amplify the signal and provide it to speakers 122A, 122B.

The received signal is also coupled to a data decoder 124 to extract digital data embedded within the over-air broadcast signal 14. This digital data may include identifying information about the broadcast station that is responsible for the over-air broadcast signal 14 transmission, such as identifying information embedded in "Radio Broadcast Data Service" (RBDS), "Station Information Service" (SIS), or "Program and System Information Protocol" (PSIP) data for example. The digital data is provided to a microprocessor 126 via data lines 128. From there, the digital data can be communicated to an optional display 136. The digital data can be also stored in memory 130 and is communicated externally from the tuner 22, through an input/output buffer 132, to the user computer 18 in the form of over-air broadcast signal acquisition information 134. This over-air broadcast signal acquisition information 134 is information noted in the flow diagram of FIG. 3 that may be communicated to the broadcast station server 28 to determine if the user computer 18 is physically located in the geographically restricted area for the requested content.

Figure 5:
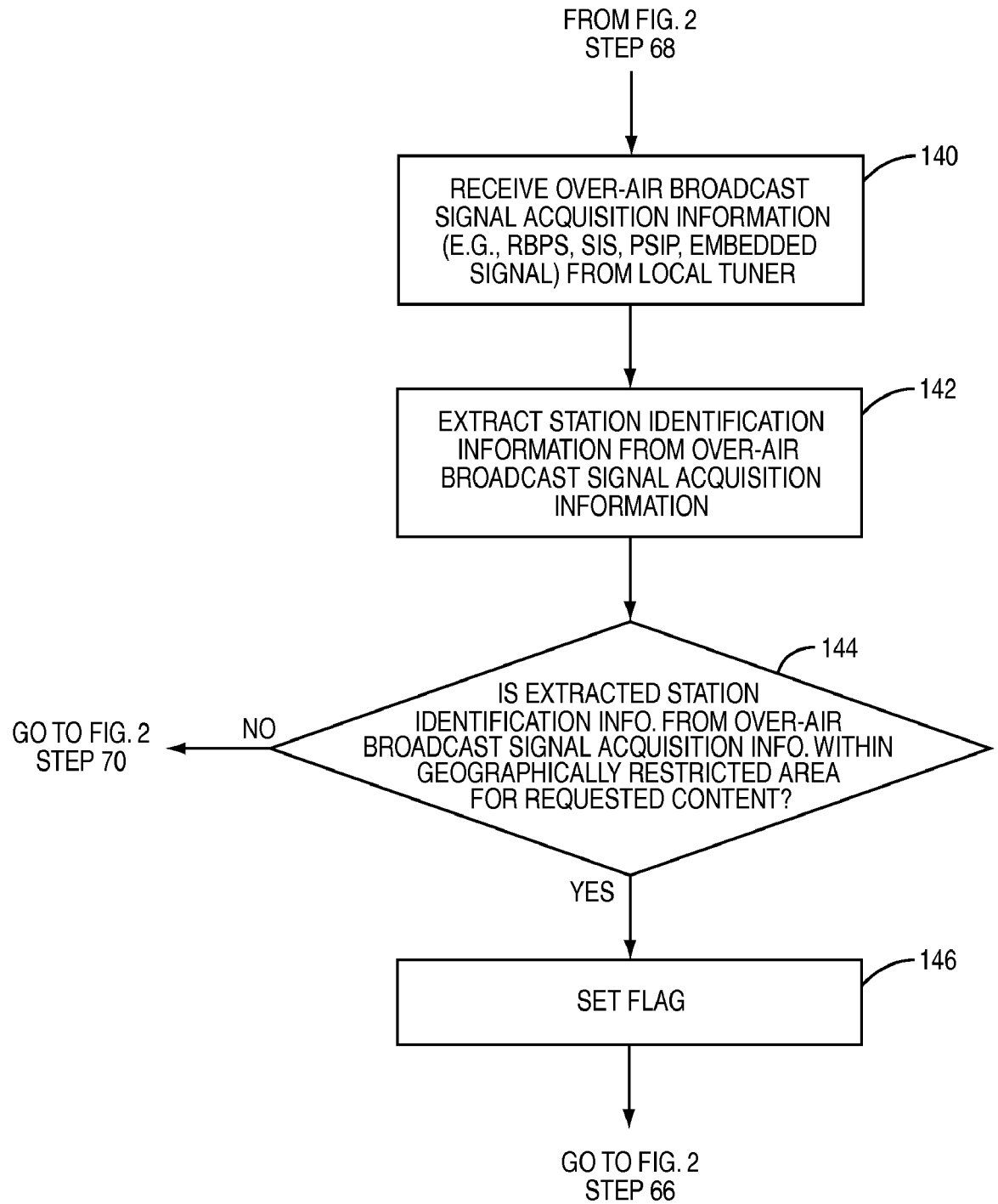
FIG. 5 is a flowchart illustrating extraction of embedded broadcast station identification information within an over-air broadcast signal received by a tuner to verify if a recipient is located within the geographically restricted area of the requested content.

FIG. 5 is a flowchart illustrating the steps used to verify the user computer 18 being located in the geographically restricted area of the requested content based on the over-air broadcast signal acquisition criteria and receipt of over-air broadcast signal acquisition information 134 in response thereto, from the tuner 22. The process is employed as part of the decision in step 68 in FIG. 2. First, the over-air broadcast signal acquisition information 134 is received from the tuner 22, such as described in FIG. 4 above (step 140). The over-air broadcast signal acquisition information 134 may be the actual broadcast signal, or other analog or digital data embedded in the over-air broadcast signal 14 in the subcarrier frequency. Whatever type of over-air broadcast signal acquisition criteria is employed, geographic-based information is extracted from the over-air broadcast signal 14 based on the over-air broadcast signal acquisition criteria sought for analysis (step 142). The geographically-based information may be the identification of the broadcast station 16 responsible for broadcasting the received over-air broadcast signal(s) 14.

Next, it is determined if the extracted geographic information indicates that the tuner 22, and thus the user computer 18, is located in the geographically restricted area for the requested content. If so, a flag may be set to indicate that the user computer 18 and/or the session with the broadcast station server 28 is authorized to receive the requested content over the network 20 (step 146). If not, the process goes to step 70 of FIG. 2, where access to the requested content is denied, since the geographic location of the user computer 18 could not be verified as being physically located in the geographically restricted area for the requested content.

"Radio Broadcasting Data Server" (RBDS) Station Identification

The standard for the "Radio Broadcast Data System" (RBDS) adopted by the National Radio Systems Committee in NRSC-4 requires FM radio broadcasters to provide their unique FCC call sign in the form of a hexadecimal Program Identification (PI) code. Thus, extraction of the PI code from an over-air FM broadcast signal can be used to identify the broadcast station 16 band thus determine the location of the user computer 18 to control granting access to geographically restricted content. The PI code is transmitted as the first block in every data group of the RBDS data, making it the most frequently repeated data. This allows for shorter and more reliable acquisition of the PI code.

Figure 6:
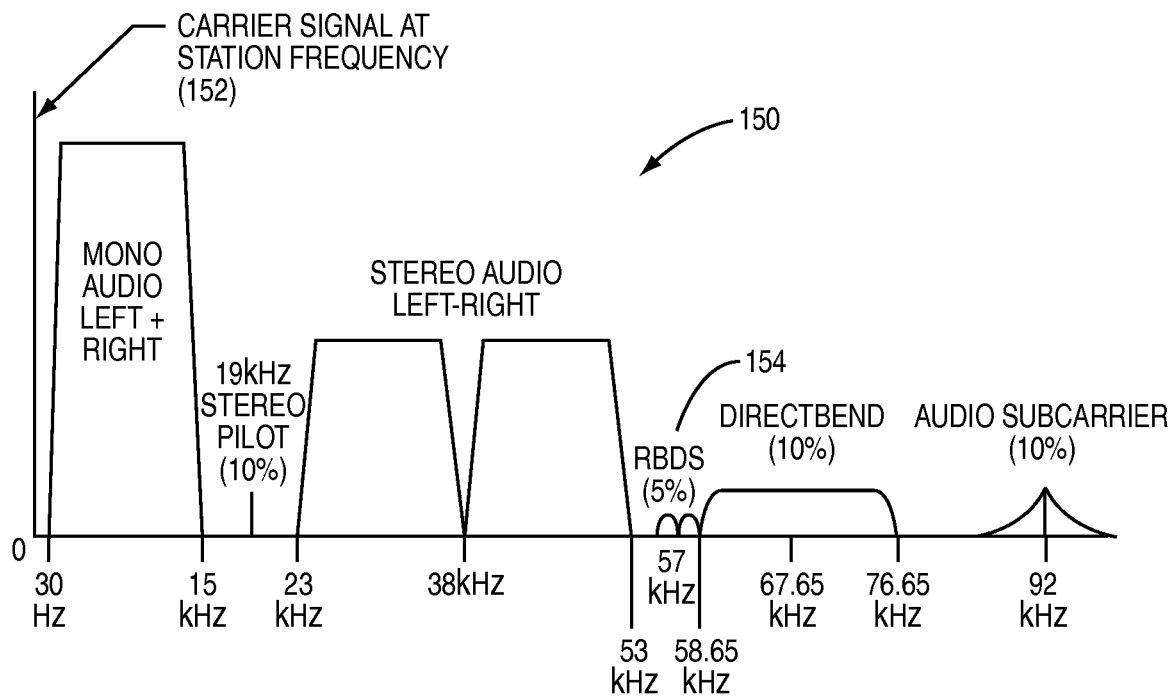
FIG. 6 is a diagram illustrating "Radio Broadcast Data System" (RBDS) information embedded in the FM subcarrier spectrum of an over-air FM broadcast signal.

FIG. 6 illustrates RBDS data 154 embedded in a FM broadcast signal 150 carried at a carrier station frequency 152. Receipt of a FM broadcast signal by a RBDS compatible tuner 22 is one method to determine if the user computer 18 is located in the geographically restricted area for the requested content as a condition of delivering such content over the computer network 20. The RBDS data 154 is included in a 57 kHz subcarrier frequency at 1187.5 bits per second. The 57 kHz frequency was chosen for being the third harmonic of the pilot tone for FM stereo so that the RBDS data 154 would not cause interference or intermodulation with the pilot tone, or the stereo difference signal at 38 KHz (e.g. second harmonic of pilot tone). In the example of RBDS, RBDS data 154 contains digital data that includes the broadcast station's identification call letters. Thus, the originating broadcaster of an over-air broadcast signal 14 can be determined by analyzing the RBDS data 154.

FIG. 7 illustrates a RBDS table 156 providing the various RBDS data group types 158 with the RBDS and a description of their use 160. The RBDS data group types 158 are digital data structures containing information embedded in the RBDS data 154 within the FM broadcast signal 150. While each RBDS data group 158 has its own specific purpose and data format, it is important to note that each data group message contains program identification (PI), which is the uniquely assigned call letters for the broadcast station 16 transmitting the FM broadcast signal 150 (e.g. WRAL-FM).

Figure 8:
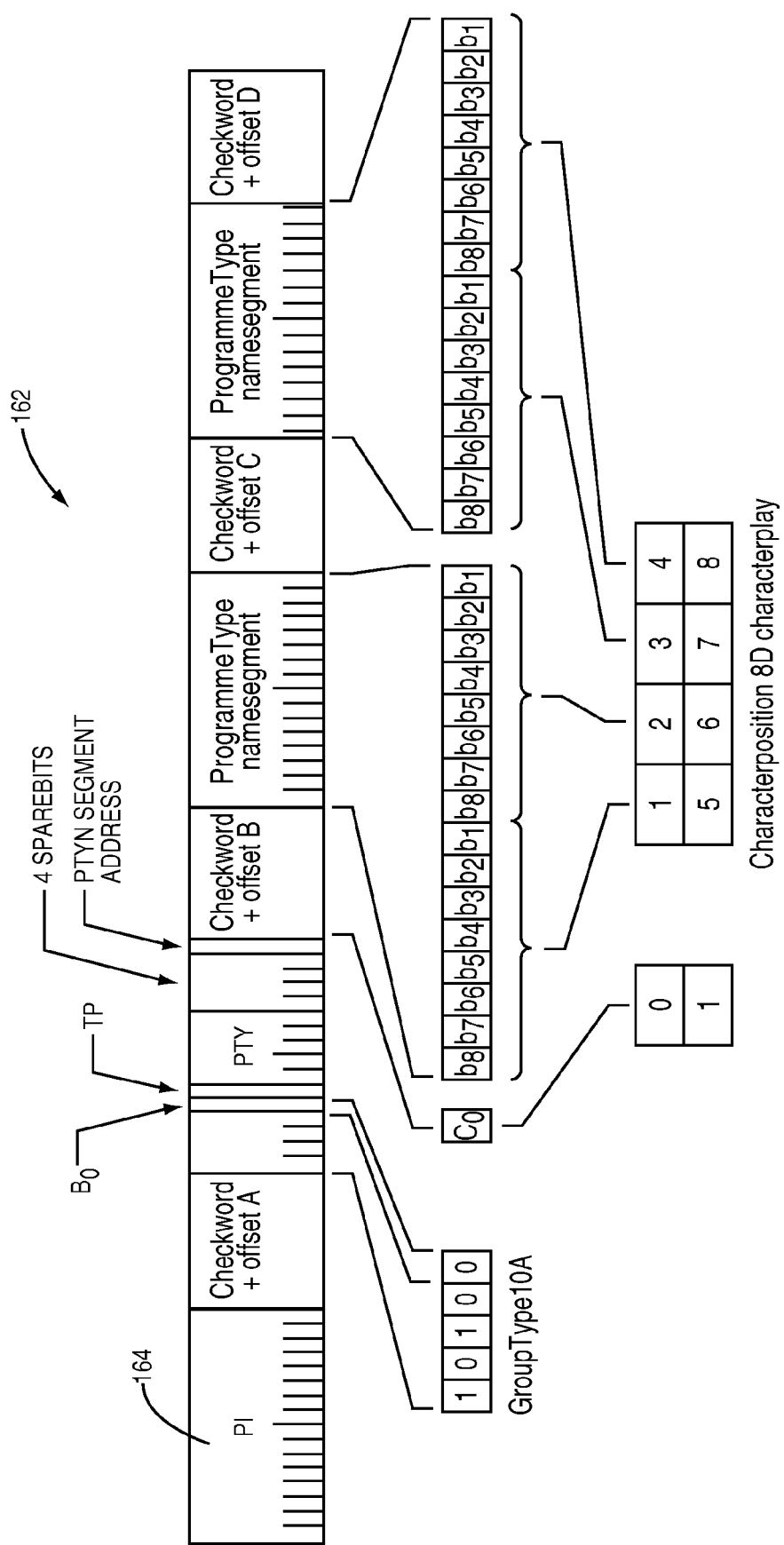
FIG. 8 illustrates a data format for a RBDS data group type within RBDS data embedded in an over-air broadcast signal, wherein program identification (PI) information is included to uniquely identify the FM broadcast station transmitting the over-air FM broadcast signal.

An example of this is shown in FIG. 8, which is the data format for RBDS group type 10A, or a program type name (PTYN) 162. There, it is shown that a PI field 164 is the header of the data for the PTYN data 162. The PI field 164 contains the "PI code." This information can be extracted by the tuner 22 and/or the user computer 18 to identify the broadcast station 16. For example, if the PI field 164 contains the call letters "WRAL-FM," this means that the originator of the received FM broadcast signal 150 is the WRAL broadcast station 16 located in Raleigh, N.C. A database can be accessed to correlate the broadcast station 16 identification information in the PI field 164 with the FCC mandated broadcast area of broadcast station 16. This information can be used, such as by the tuner 22, the user computer 18, and/or the broadcast station server 28, to determine the physical location of the user computer 18 (i.e. Raleigh, N.C. area for PI information "WRAL-FM"). This is because the tuner 22 must be physically located in the broadcast area of the broadcast station 16 to receive its over-air FM broadcast signal 150.

More information on RBDS can be found at "The Radio Data System "RDS" in Europe and the Radio Broadcast Data System "RBDS" in the USA—What are the differences and how can receivers cope with both systems," at http://www.rds.org.uk/rdsfrdsrbds.html, and the definition of Radio Data System in Wikipedia® at http://en.wikipedia.org/wiki/Radi_Data_System, both of which are incorporated herein by reference in their entireties.

"Station Information Service" (SIS)

A high definition (HD) over-air radio broadcast signal may also be used to identify the broadcast station 16. The standard for In-band/On-channel Digital Radio Broadcasting adopted by the National Radio Systems Committee in NRSC-5-A, commonly referred to as "HD Radio," allows for AM/FM radio station broadcasters to provide their unique FCC call sign, FCC facility number, and three-dimensional geographic station location within "Station Information Service" (SIS) data. SIS data is transmitted via a dedicated logical channel within the RF/transmission subsystem. The standard specifically states that "SIS can be considered a built-in service that is readily available on all IBOC digital radio stations." For more information on SIS, see the National Radio Systems Committee document, NRSC-5-A 5.1.2 September 2005, incorporated herein by reference in its entirety.

"Nielsen's Audio Encoding Technique" (NAVE) Coding

Other audio encoding techniques may be embedded FM radio broadcast signals by broadcast stations 16 to determine the location of the user 12 and the user computer 18, and thus whether the user computer 18 is located in the geographically restricted area for the requested content. For example, the Nielsen's Audio Video Encoding Technique (NAVE), which is more fully disclosed in "The Nielsen Audio Video Encoder (NAVE) Questions & Answers," at http://www.nielsenmedia.com/forclients/APMeter/file/NAVEQA.pdf and incorporated herein by reference in its entirety, embeds a very small amount of audio energy in louder portions of an audio signal to ensure the non-audibility of the code. The tuner 22 can decode a received audio broadcast signal to retrieve the NAVE code, if present, if the NAVE code is used as the over-air broadcast acquisition criteria. The NAVE coding survives AC-3 and MPEG-2 compression encoding.

"Program and System Information Protocol" (PSIP) Station Identification

Figure 9:
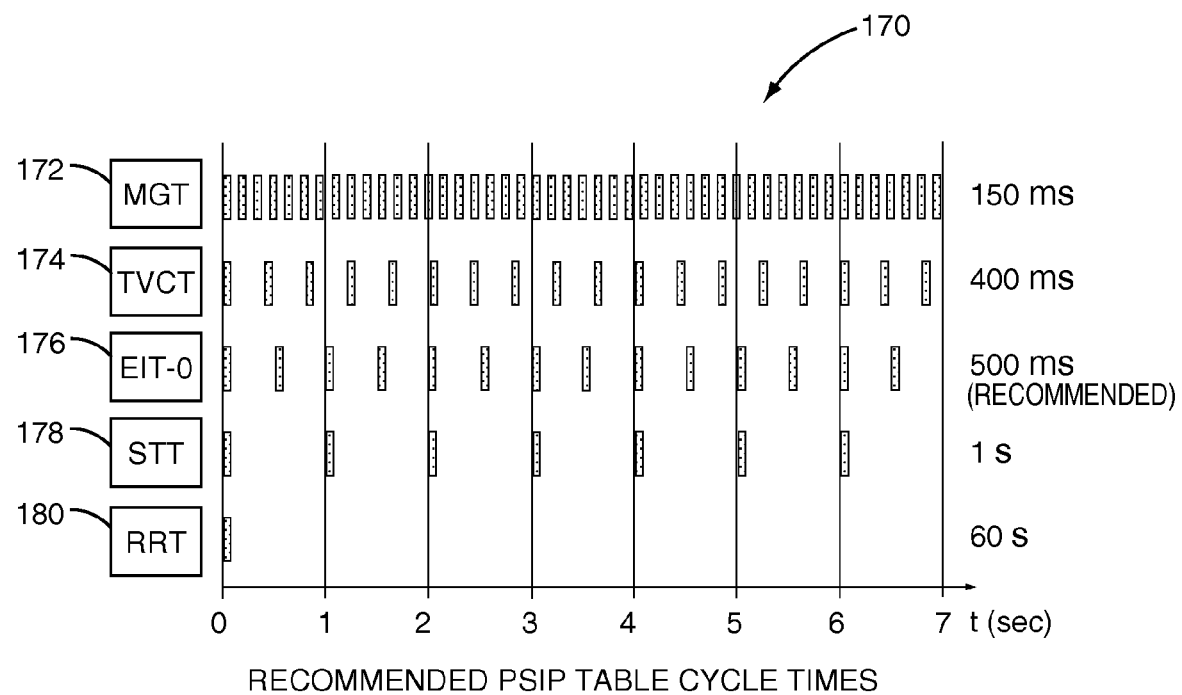
FIG. 9 illustrates "Program and System Information Protocol" (PSIP) data embedded within an over-air television (TV) broadcast signal.

In a similar manner, a television broadcast over-air signal (e.g. high definition signal), or information embedded therein, may be used as the over-air broadcast signal acquisition criteria to determine if the user computer 18 is located in the geographically restricted area for the requested content. Similar to radio broadcast signals, data may be included or embedded in television broadcast signals. In particular, "Program and System Information Protocol" (PSIP) data 170 is embedded in a digital television broadcast signal, and may also be embedded in an analog television signal. Within PSIP data 170 a transport stream identifier (TSID) is an included number that is unique to each broadcast station (e.g. WRAL is 1850). PSIP 170 data embedded in a digital television broadcast signal also includes the unique "call letters" of the broadcast station (e.g. "WRAL"). FIG. 9 illustrates the various types of information within the PSIP data 170 that is embedded in either an analog or digital television broadcast signal, and the various cycle times in which the PSIP data 170 is included.

Master Guide Table (MGT) data 172 is included in the PSIP data 170 which provides information on all the other PSIP tables, including table sizes and version numbers of updatable tables. The Virtual Channel Table (TVCT) data 174 provides information on all the channels that are or will be on line, including such items as channel name, navigation identifier, stream components and types. Event Information Table (EIT) data 176 is included for each event or TV program associated with each of the virtual channels. Each EIT covers a period of three hours. The total number of EITs available is one hundred twenty eight. EIT-0 data 174 covers the current programs, EIT-1 covers the next three hours, and so on. System Time Table (STT) data 178 fits in one MPEG packet, and provides time-of-day information. Rating Region Table (RRT) data 180 is designed to transmit program rating information for any country that may adopt the standard.

Figure 10:
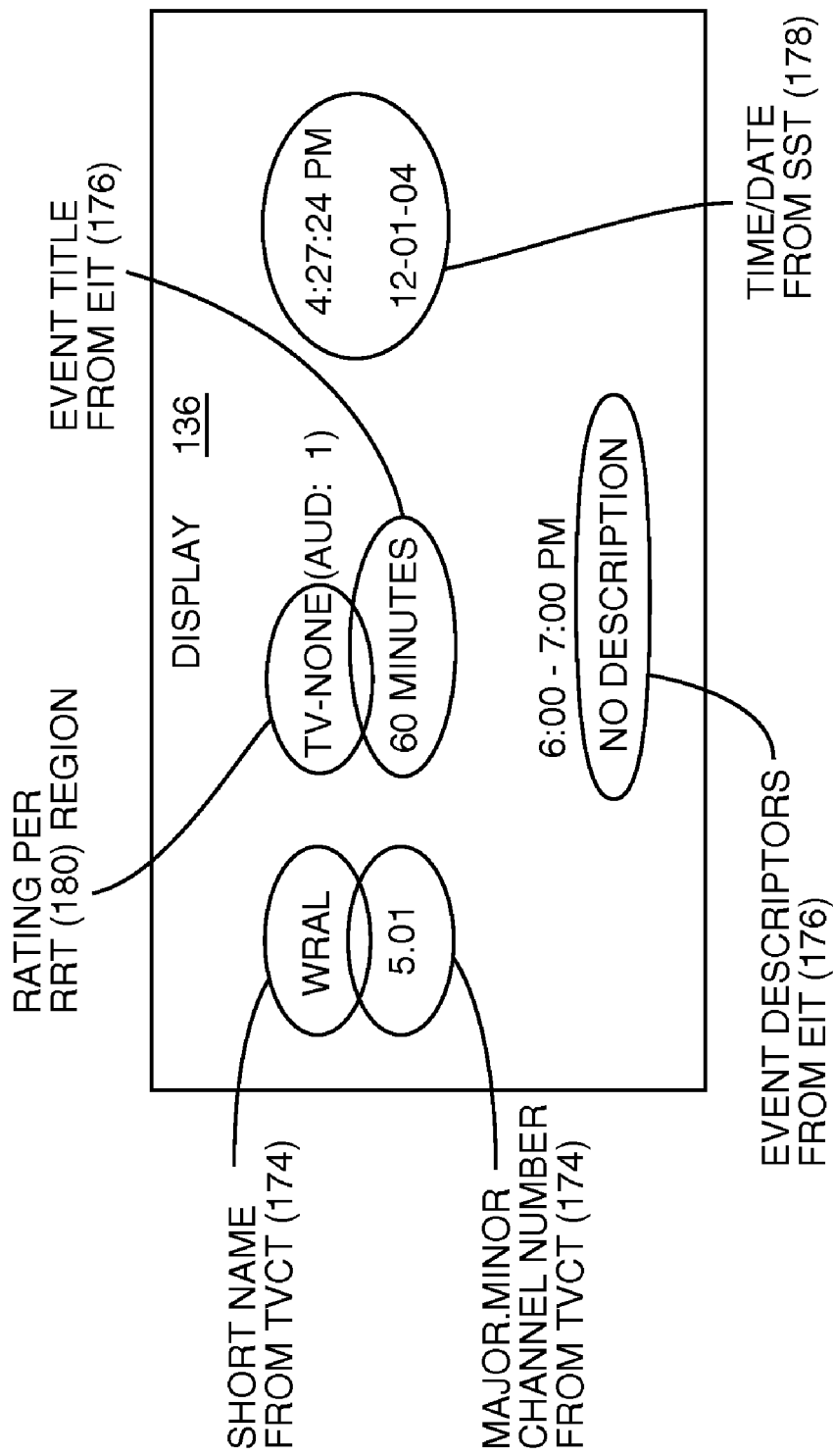
FIG. 10 illustrates information included within PSIP data, including identification information that uniquely identifies a TV broadcast station.

FIG. 10 illustrates information from the PSIP data 170 that can be displayed on a tuner display as an example of the information contained in the PSIP data 170 for digital television. The short name for the television broadcast station (e.g. WRAL) is contained within the TVCT data 174. The major and minor digital television channel being received is also contained within the TVCT data 174. The television program name, called an "event title," is contained within the EIT data 176. The rating for the television program is contained within the RRT data 180. The event or television program descriptor providing information about the program is contained within the EIT data 176. The current time and date information is contained within the STT data 178. This data is extracted and used by the television tuner to provide time-based functions and programming for the user 12.

More information on PSIP is disclosed in "ATSC Recommended Practice: Program and System Information Protocol Implementation Guidelines for Broadcasters," found at http://www.atsc.org/standards/a_69.pdf, which is incorporated herein by reference in its entirety. Note that for embodiment of the present invention that use an over-air broadcast signal 14 as the particular type of signal to determine if the user computer 18 is in the geographically restricted area of the requested content, the present invention is not limited to a particular type of over-air broadcast signal being used. Also note that the present invention is not limited to retrieval of embedded RBDS data, SIS data, PSIP data, or NAVE coding data. Any type of special coding or data may be included in the over-air broadcast signal to by received by the tuner 22 associated with the user computer 18, including but not limited to audio coding data, video coding data, analog coding data, and digital coding data.

In summary for the over-air signal being an over-air broadcast signal 14 embodiment, the tuner 22 coupled to the user computer 18 can be provided with over-air broadcast signal acquisition criteria. The over-air broadcast signal acquisition criteria provide instructions on which over-air broadcast signal(s) 14 for the tuner 22 to access, to confirm the user computer 18 is physically located in the geographically restricted area for the requested content, before requested content is transmitted by a broadcast station server 28 over the network 20, such as the Internet. The tuner 22 is able to obtain information within the received over-air broadcast signal 14 that identifies the broadcasting station 16 and provides the identification information in the form of over-air broadcast signal acquisition information 134. If the broadcast station 16 is identified as having a broadcast range within or synonymous to the geographically restricted area for the requested content, it is known that the user computer 18 is physically located in the geographically restricted area for the restricted content sufficient for the content to be communicated over the network 20 to the user computer 18.

Figure 11:
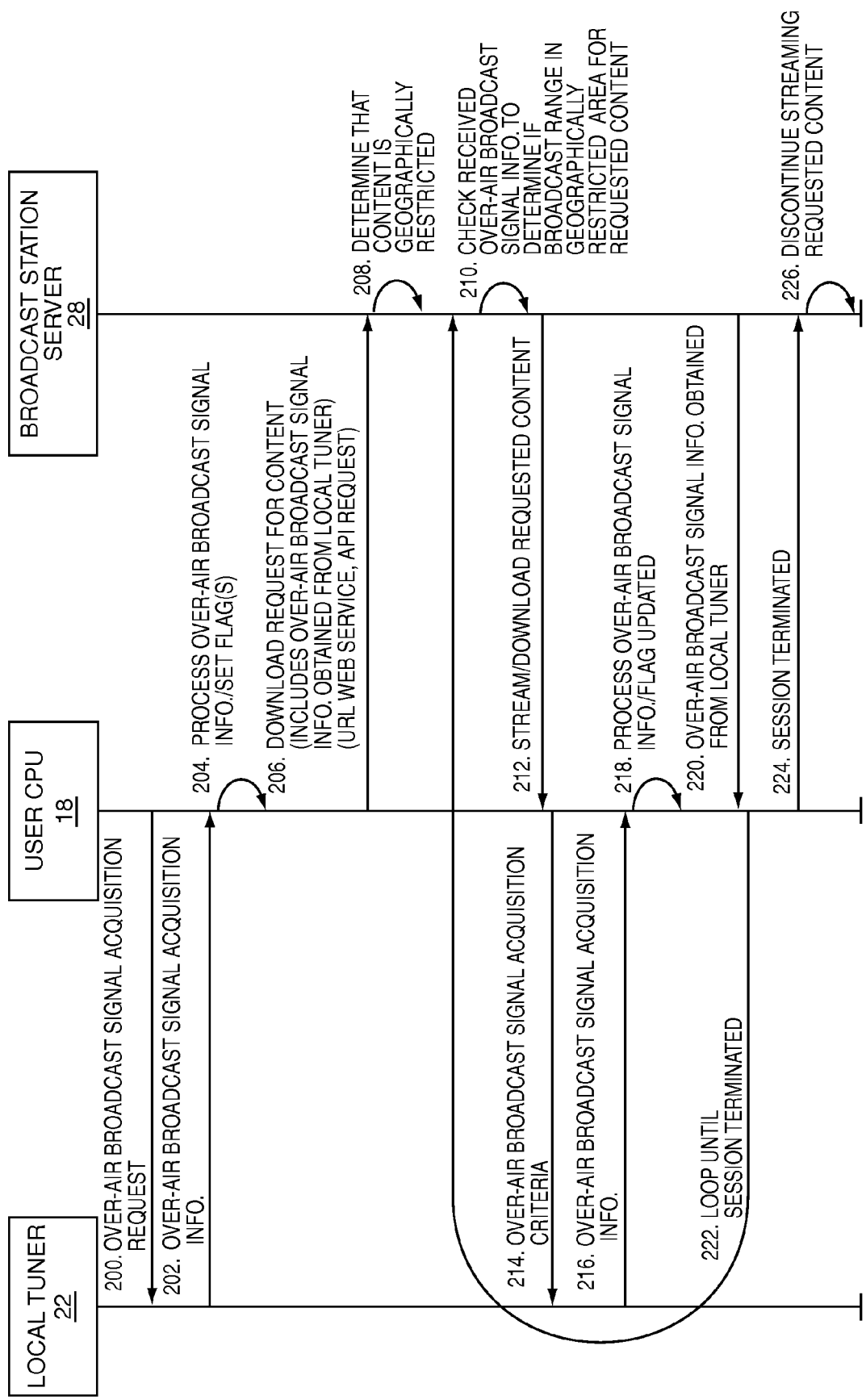
FIG. 11 is an alternative flow diagram to the flow diagram illustrated in FIG. 3, wherein the recipient's computer obtains the over-air signal acquisition information from a local tuner before requesting content from a content server.

FIG. 11 is a flow diagram illustrating an alternative embodiment to the flow diagram illustrated in FIG. 3 for delivery of requested content over the network 20. In this embodiment, the user computer 18 requests over-air broadcast signal acquisition information from the tuner 22, using the over-air broadcast signal acquisition criteria, before requesting content from the broadcast station server 28. The over-air broadcast signal acquisition criteria may be stored in the memory of the user computer 18. In this manner, the user computer 18 can provide the over-air broadcast signal acquisition criteria, which identifies the location of the user computer 18 by broadcast area, to the broadcast station server 28 on the initial content request rather than the broadcast station server 28 having to first provide the over-air broadcast signal acquisition criteria to the user computer 18, as provided in the flow diagram in FIG. 3.

The process starts by the user computer 18 requesting over-air broadcast signal acquisition information 134 from the tuner 22 based on the over-air broadcast signal acquisition criteria. The over-air broadcast signal acquisition information 134 is used to verify the user computer 18 location as previously discussed (step 200). The tuner 22 returns the over-air broadcast signal acquisition information 134 obtained, based on the over-air broadcast acquisition criteria sought (step 202). The over-air broadcast acquisition criteria may be stored in memory of the user computer 18, and may be generated based on the user's 12 physical address information known by the user computer 18. The user computer 18 can look up the correct over-air broadcast signal acquisition criteria to be used by the tuner 22 based on the user's address or location information. The user computer 18 may process the over-air broadcast signal acquisition information 134 and/or set flags in memory to indicate the physical location or broadcast area where the user computer 18 is verified to be located, according to the tuner 22 reception of the over-air broadcast signal 14 (step 204). Again, note that the over-air broadcast signal acquisition criteria does not have to include an over-air broadcast signal that carries the same content as the user 12 requested content over the network 20 from the broadcast station server 28.

Thereafter, the user computer 18 makes a download or stream request for the content to the broadcast station server 28 over the network 20, typically using either web-based services or API software previously downloaded to the user computer 18 from the broadcast station server 28 (step 206). Included within the request is the over-air broadcast signal acquisition information 134 obtained from the tuner 22. The broadcast station server 28 determines whether the requested content is geographically restricted (step 208). If so, the broadcast station server 28 reviews the over-air broadcast signal acquisition information 134 to determine if the tuner 22 is able to obtain information that could only be obtained by a tuner located in the same or equivalent geographically restricted areas for the requested content (step 210). The requested content is then downloaded or streamed over the network 20 to the user computer 18 (step 212). The user computer 18 continues to obtain over-air broadcast signal acquisition information 134 from the tuner 22 (steps 214, 216, 218) and communicate this information to the broadcast station server 28 (step 220) (step 224, returning back to step 210) to determine if the user computer 18 remains in the geographically restricted area for receiving the requested content over the network 20 as opposed to over-air reception (step 212). The process continues until the user computer 18 session with the broadcast station server 28 is terminated (steps 224, 226).

Figure 12:
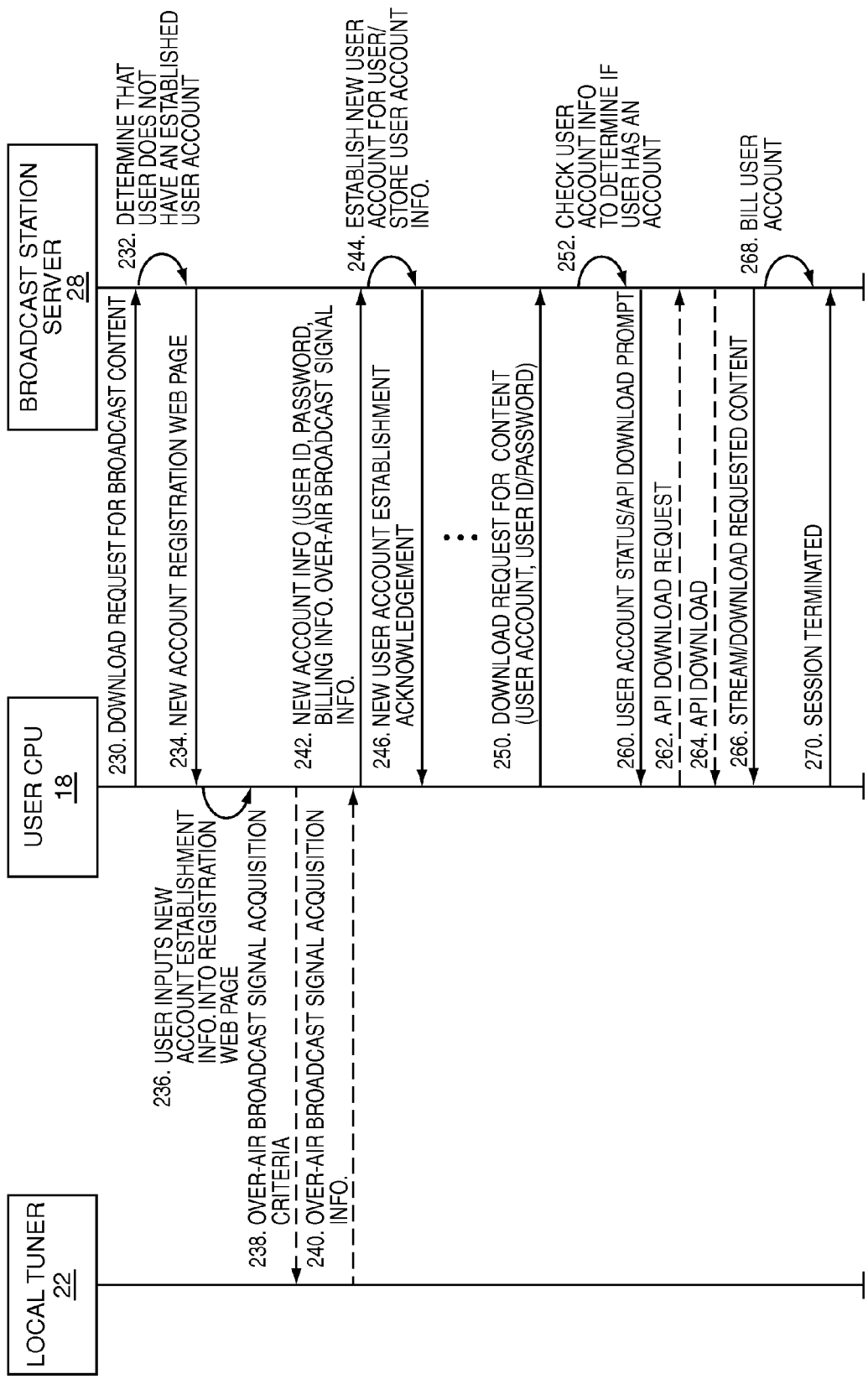
FIG. 12 is a flow diagram illustrating communications between a receiver, a local tuner, and a content server, for establishing a recipient account at the content server before requested content is delivered over a computer network.

It may be desired by the broadcast station server 28 to require the user 12 to first establish a user account on the server 28 before content will be provided to the user computer 18 over the network 20. A user account may be used for various reasons, including but not limited to, identifying the user 12, providing special services to the user 12, obtaining billing information if the user 12 is charged for receiving content over the network 20, and/or providing more target advertising to the user 12 based on demographic information. FIG. 12 is a flow diagram illustrating one example of the user 12 requesting and establishing a new user account on the broadcast station server 28 when a request is made for content over the computer network 20.

The process starts by the user computer 18 requesting content from the broadcast station server 28 over the network 20 (step 230). Because the user computer 18 does not return identifying information about the user 12 that indicates the user 12 already has an established account on the broadcast station server 28 (step 232), the broadcast station server 28 generates and sends a new account registration web page to the user computer 18 (step 234). The user 12 inputs new account information requested in the fields and various prompts in the registration web page. At this point, the user computer 18 may also request to receive over-air broadcast signal acquisition information 134 from the tuner 22 based on over-air broadcast signal acquisition criteria using information, such as the user's 12 physical address entered by the user 12, or other location information for example (steps 240, 242). The user's location information may come from answers provided by the user 12 in the registration web page. The user 12 may provide their desired user id and password for subsequent access to the broadcast station server 28 so the server 28 can access the user's 12 account. The user computer 18 can then determine initially if the user 12 is authorized to receive content from the broadcast station server 28 over the network 20. If not, the process can be discontinued without a user account being established.

If the user computer 18 determines that a user account can be established for the user 12 based on verification of the user's 12 location, as determined from the over-air broadcast acquisition information 134, the user computer 18 transmits the new user account information to the broadcast station server 28 to establish a user account for the user 12 (step 244). The broadcast station server 28 creates the user account (step 246) and sends an acknowledgement of the user account creation to the user computer 18 (step 248).

The broadcast station server 28 may provide content download and/or streaming services via an API software package downloaded to the user computer 18, in lieu of web-based services. The broadcast station server 28 may be configured to only allow downloading of an API software package for content requests over the network 20 after the user 12 has successfully established a user account and has logged in. When the user 12 first establishes a user account, the user 12 will be logged in automatically after receiving the new account establishment acknowledgement (step 248). In this regard, after a user 12 sends a content request to the broadcast station server 28 (step 250), the broadcast station server 28 verifies the validity of the user account (step 252). The broadcast station server 28 sends an API software download request prompt to the user 12 to first download the API software to the user computer 18 (step 260). The user computer 18 then returns a download request (step 262), and the broadcast station server 28 downloads the API software to the user computer 18 (step 264). The user 12 will then execute the API software resident on the user computer 18 to communicate with the broadcast station server 28 to request content over the network 20 as previously discussed (steps 266-270).

It may also be desired to use additional information indicative of the user's 12 and the user computer's 18 location in conjunction with over-air broadcast signal acquisition information 134 to determine if the user 12 is within the geographically restricted area of the requested content. Over-air broadcast signal acquisition information 134 may still be received by the tuner 22 even if the user computer 18 is slightly outside the exact geographic boundaries of the broadcast station's 16 broadcast area. Broadcasting areas provided in an FCC license may include sharp boundaries and borders that cannot be perfectly matched with broadcast signal transmission equipment and repeaters 46. Thus, the tuner 22 may still receive the proper over-air broadcast signal acquisition information 134 even though the user computer 18 is technically outside the permitted broadcast area. In this regard, one method of additionally verifying that the user 12 is authorized to access the geographically restricted content from the broadcast station 16 over the network 20 is to verify the user's billing address using the user's credit or debit card account information.

Over-Air Signals Outside AM/FM/UHF/VHF Broadcasting Frequencies

The tuner 22 associated with the recipient computer 18 may also or alternatively be adapted to receiver over-air signals having transmission frequencies outside AM/FM/UHF/VHF broadcast signal frequencies. In this regard, the over-air broadcast signal acquisition criteria and the over-air broadcast signal acquisition information 134 would simply be over-air acquisition criteria and over-air signal acquisition information, respectively. The operation of the present invention, when using a non-broadcast range over-air signal based on air acquisition criteria, and producing over-air signal acquisition information, may be as or similar described above for an over-air broadcast signal 14 in particular. The present invention and its examples disclosed herein are applicable for any over-air signal that can be used to indicate whether a recipient is located in a geographically restricted area for the requested content.

For example, "Worldwide Interoperability for Microwave Access" (WiMAX). WiMAx is a standard being developed to enable the delivery of last mile wireless broadband access as an alternative to cable or DSL broadband access. WiMAX has a range of up to 30 miles with a typical cell radius of four to six miles. WiMAX covers a couple of different frequency ranges. The IEEE 802.16 standard addresses frequencies from 10 GHz to 66 GHz. The IEEE 802.16a specification, which is an extension of IEEE 802.16, covers bands in the 2 GHz-to-10 GHz range. Either receipt of a WiMAX signal, or a special coding or signal embedded into a WiMAX signal, may be received over-air by a tuner associated with the recipient computer to determine if the recipient computer is located in the geographically restricted area for the requested content.

Figure 13:
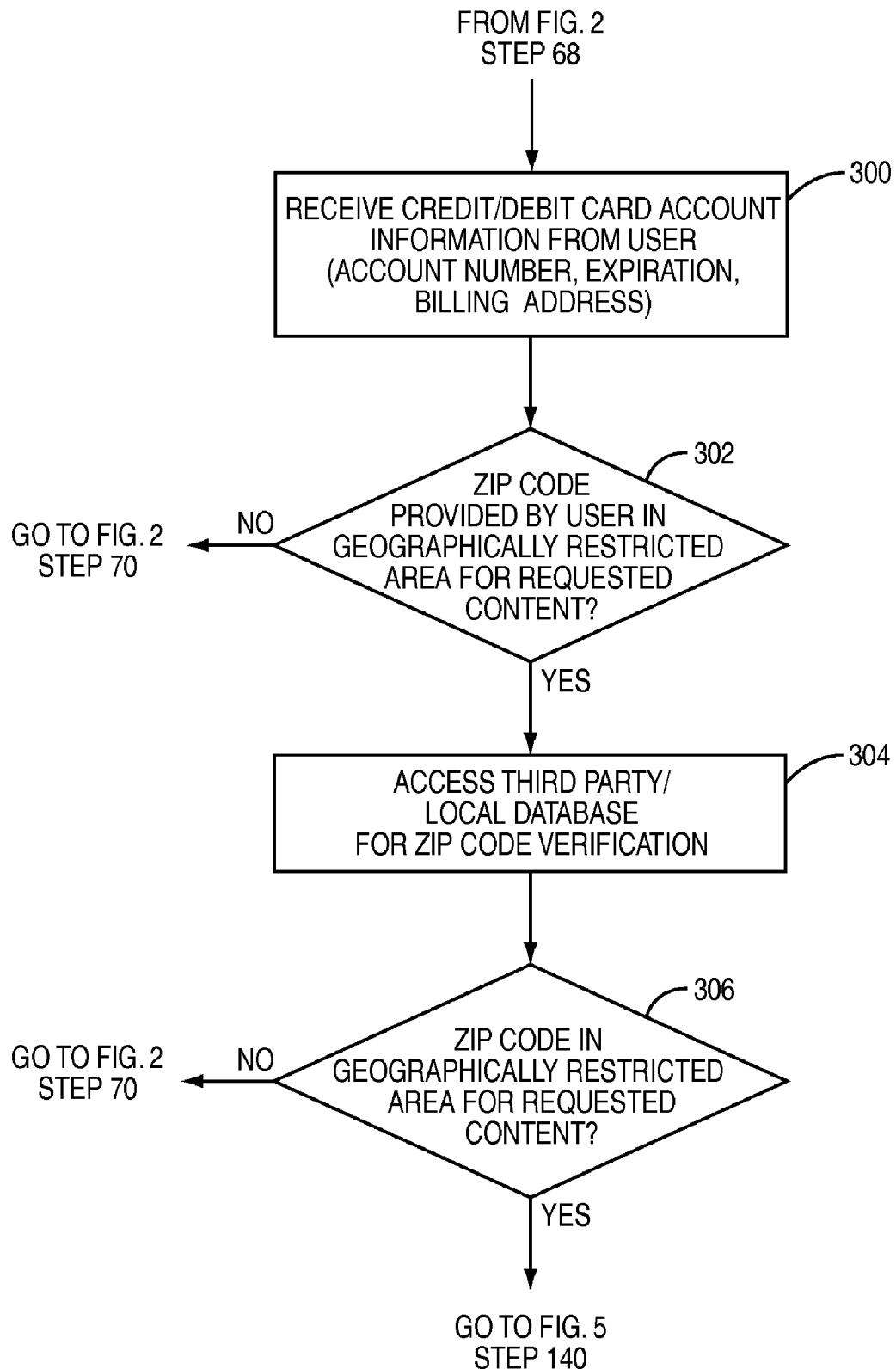
FIG. 13 is a flowchart illustrating additionally verifying a recipient's credit or debit card billing address information to verify if a recipient is within the geographically restricted area of the requested content.
Figure 14:
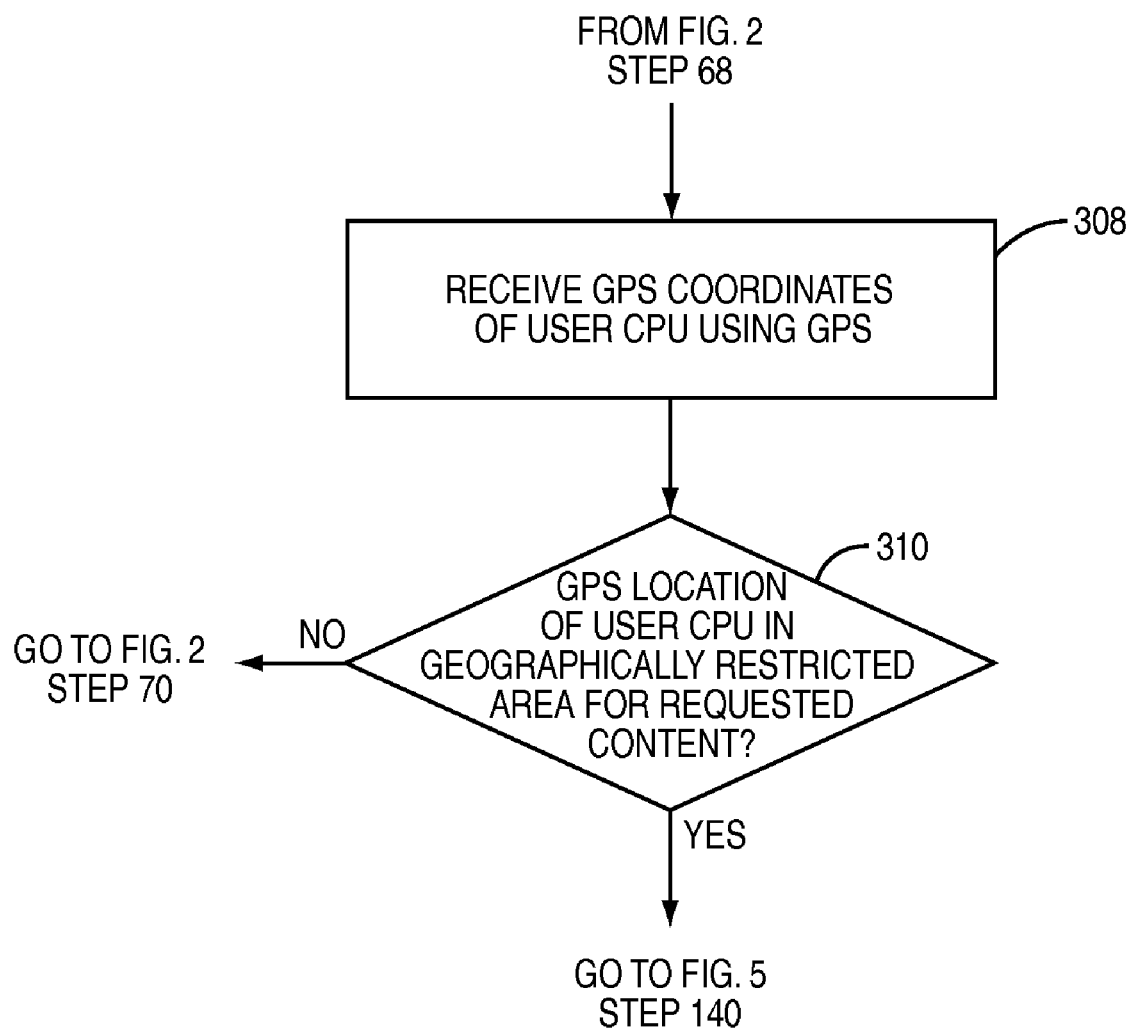
FIG. 14 is a flowchart illustrating additionally verifying a recipient's physical location via a GPS receiver to verify if a recipient is located within the geographically restricted area of the requested content.

Other examples include signals in the 700 MHz spectrum, which may be utilized to deliver content to mobile phones. The 700 MHZ spectrum includes signals that can be broadcast by television broadcast stations like UHF and VHF signals, but is a spectrum that may television broadcast stations have vacated or no longer use for programming broadcasts. The present invention is not limited to any particular type of over-air signal to determine if the recipient's computer is located in the geographically restricted area for the requested content Credit/Debit Card Account Billing Address Look-Up/Verification The flowchart illustrated in FIG. 13 provides additional user 12 address determination and/or verification in conjunction with the over-air broadcast signal acquisition information 134 checking provided in the flowchart of FIGS. 2 and/or 5. In one embodiment, after the over-air broadcast signal acquisition information 134 obtained by the tuner 22 is verified as being proper for geographic restrictions for the requested content (in decision 144 in FIG. 5), the user 12 may also be prompted for their credit or debit card account information to verify the user's 12 billing address. The billing address can be used to determine if the user's 12 residence is located within the geographically restricted area for the content requested over the network 20. The user 12 may have already been required to associate a credit or debit card account to establish their user account, or the credit/debit card account information may simply be requested from the user for billing address verification after content is requested over the network 20. Note that the broadcast station server 28 can be configured to use the user's credit/debit card account information solely for address determination/verification without billing the user 12.

The user's 12 credit or debit card account information, such as account number, expiration date, and/or billing address information, is received from the user computer 18 (step 300). The information may be checked locally at the user computer 18 or sent over the network 20 to the broadcast station server 28 for checking. The checking may consist of verification of the billing address provided by the user 12 when creating their user account, or may consist of using the card account information to look up the user's 12 actual billing address via a database access. Before the user's card account information is checked against a database, the zip code provided by the user 12 may be checked (decision 302). If the zip code is outside of geographically restricted areas for the requested content (decision 302), the user's 12 request can be denied without having to access a card account database (by returning to step 70 in FIG. 2). If the user 12 provided a zip code that is within the geographically restricted area for the requested content, the account number and expiration date are used to access a third party database to verify or obtain the user's 12 billing address (step 304). Third parties provide subscription-based services for obtaining and/or verifying a user's 12 billing address based on providing a credit/debit card account information. If the credit/debit card billing address and/or zip code can be verified as being in the geographically restricted area of the requested content (decision 306), the broadcast station server 28 provides the requested geographically restricted content to the user computer 18 over the network 20 (step 140 of FIG. 5). If not, the request is denied (step 70 of FIG. 2). Note that the credit/debit card billing address verification method may be used in addition to, or in lieu of the over-air broadcast signal acquisition information 134 verification method (see, e.g., FIG. 5).

GPS Receiver

Other methods may be used to determine if the user 12 is located in the geographically restricted area of the requested content for content delivery over the network 20. For example, a global positioning system (GPS) receiver (not shown) may be coupled to the user computer 18, similar to the tuner 22, to determine the exact geographic coordinates of the user computer 18, in conjunction with or in lieu of receiving and checking over-air broadcast signal acquisition information 134. In one embodiment, after the over-air broadcast acquisition information 134 obtained by the tuner 22 is verified as being proper for the geographically restricted area for the requested content (e.g. decision 144 in FIG. 5), the GPS coordinates of the user computer's 18 are obtained using a GPS receiver (step 308). If the GPS coordinates of the user computer 18 are outside the geographically restricted area for the requested content 20 (decision 310), access to the requested content over the network 20 is denied (step 70 of FIG. 2). If the GPS coordinates of the user computer 18 are inside the geographically restricted area for the requested content, the broadcast station server 28 provides the requested content over the network 20 to the user computer 18 (step 140 of FIG. 5). Note that the GPS coordinates may be used in addition to or in lieu of receiving the over-air broadcast signal acquisition information 134 verification method (see, e.g., FIG. 5).

Reverse IP Address Lookup

Another example of technology that may be used, in conjunction with or in lieu of the over-air broadcast signal acquisition information 134 checking (provided in the flowchart of FIGS. 2 and/or 5) to determine if the user computer 18 is located in the geographically restricted area for the requested content, is use of reverse IP address lookup. When the user computer 18 accesses the network 20, in the example of an Internet network, the user computer 18 is assigned a unique IP address by the ISP 24. The IP address is associated with the physical address of the company that purchased the particular IP address or block of IP addresses. Thus, by accessing a reverse IP database, address to look up the associated physical address, location information regarding the user computer 18 can be determined. Although reverse IP address lookup is not as accurate as other methods, because the ISP 24 may be located in a different area from the user computer 18, it is another method that can be used to control access to geographically restricted content if desired.

Figure 15:
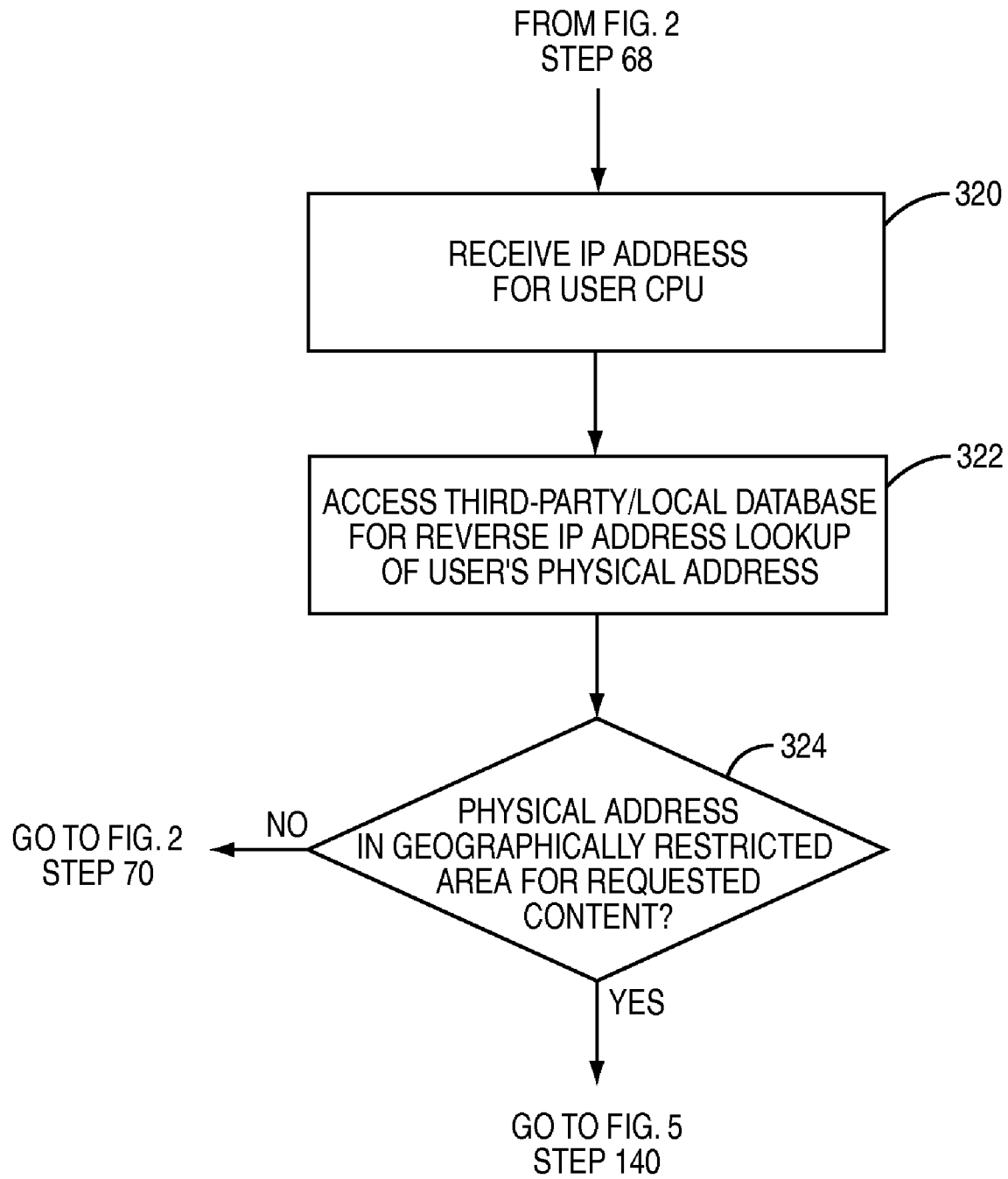
FIG. 15 is a flowchart illustrating additionally verifying a recipient's physical location via a reverse Internet Protocol (IP) address lookup to verify if a recipient is located within the geographically restricted area of the requested content.

In one embodiment, as illustrated in flowchart of FIG. 15, after the over-air broadcast acquisition information 134 obtained by the tuner 22 is verified as being proper for the licensing area in decision 144 in FIG. 5, the user computer's 18 IP address is obtained (step 320). The physical address associated with the IP address used by the user computer 18 is obtained from a third party database using a reverse IP address lookup service (step 322). If the physical address associated with the IP address used by the user computer 18 is outside the geographically restricted area for the requested content over the network 20 (decision 324), access is denied (step 70 of FIG. 2). If the physical address associated with the IP address used by the user computer 18 is inside the geographically restricted area for the requested content over the network 20, the broadcast station server 28 provides the requested content over the network 20 to the user computer 18 (step 140 of FIG. 5). Note that the reverse IP address lookup method may be used in addition to or in lieu of the over-air broadcast signal acquisition information 134 verification method (see, e.g., FIG. 5).

"Automated Number Identifier" (ANI) Information

Another example of technology that may be used, in conjunction with or in lieu of the over-air broadcast signal acquisition information 134 checking (provided in the flowchart of FIGS. 2 and/or 5) to determine if the user computer 18 is located in the geographically restricted area for the requested content, is use of the telephone number or area code used by the user computer 18 to connect to the network 20. An example of this technology that may be employed by the present invention is disclosed in Patent Cooperation Treaty (PCT) Application No. PCT/US01/08382 entitled "On-line Lottery Game System," incorporated herein by reference in its entirety.

When the user computer 18 accesses the network 20, in the example of an Internet network, any automated number identifier (ANI) is generated by the telephone company to the ISP 24 supporting the user computer 18 connection to the network 18. The ANI is stored as caller identification information. The caller identification information, such as the telephone number or just the area code portion of the telephone number, is used to determine if the user computer 18 is located in the geographically restricted area for the requested content.

Figure 16:
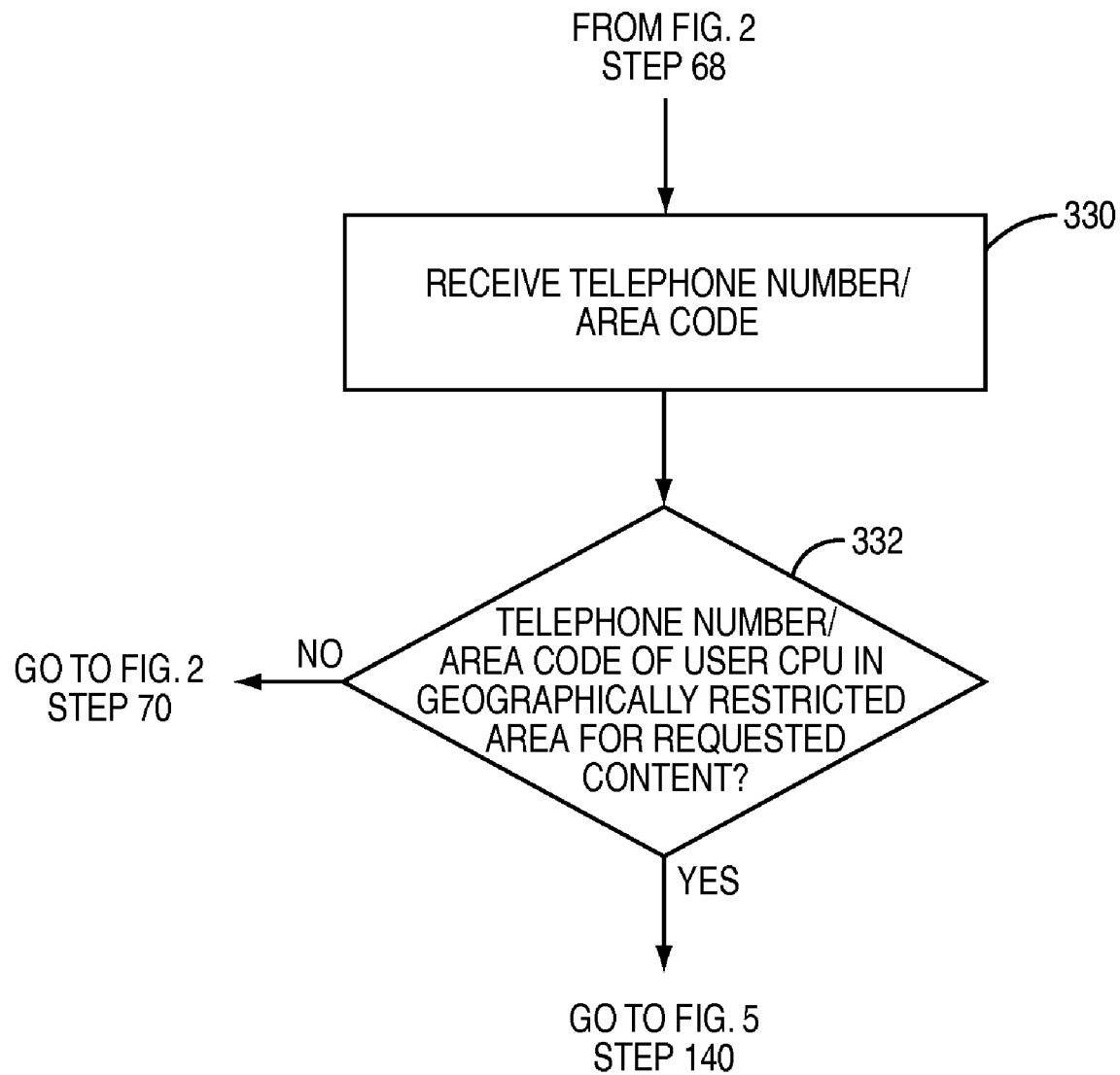
FIG. 16 is a flowchart illustrating additionally verifying a recipient's physical location via an Automated Number Identifier (ANI) lookup of the recipient to verify if a recipient is located within the geographically restricted area of the requested content

In one embodiment, as illustrated in the flowchart of FIG. 16, after the over-air broadcast acquisition information 134 obtained by the tuner 22 is verified as being proper for the licensing area in decision 144 in FIG. 5, the user computer's 18 ANI information is obtained by the ISP 24 from a telephone company and/or third party database (step 330). The physical address associated with the ANI information (e.g. telephone number, or area code of telephone number) is used determined. If the physical address associated with the ANI information is outside the geographically restricted area for the requested content over the network 20 (decision 332), access is denied (step 70 of FIG. 2). If the physical address associated with the ANI information is inside the geographically restricted area for the requested content over the network 20, the broadcast station server 28 provides the requested content over the network 20 to the user computer 18 (step 140 of FIG. 5). Note that the ANI lookup method may be used in addition to or in lieu of the over-air broadcast signal acquisition information 134 verification method (see, e.g., FIG. 5).

Those skilled in the art will recognize improvements and modifications to the preferred embodiments of the present invention. All such improvements and modifications are considered within the scope of the concepts disclosed herein and the claims that follow.

What is claimed is:

1. A method of delivering geographically restricted content over a computer network to a recipient device in response to a content server coupled to the computer network receiving a request for the geographically restricted content, comprising: receiving a request for delivery of geographically restricted content from a recipient device over a computer network at a content server; continued receiving of over-air signal acquisition information from the recipient device indicative of whether the recipient device is located within a geographically restricted area for the requested geographically restricted content as a condition for continued delivery of the requested geographically restricted content, wherein the geographically restricted area is defined within a broadcast range of at least one broadcast antenna representative of a geographic area where a recipient device is only permitted to receive the geographically restricted content; and wherein the received over-air signal acquisition information comprises a selectively tuned over-air signal containing embedded information to be extracted identifying a broadcast station indicative of a geographic area location of the recipient device; determining if the recipient device is located within the geographically restricted area for the requested geographically restricted content based on the received over-air signal acquisition information; and delivering the requested geographically restricted content to the recipient device over the computer network only if the recipient device is located within the geographically restricted area for the requested geographically restricted content.

2. The method of claim 1, wherein the recipient device is comprised from the group consisting of a personal computer, a network device, a television set top box, a mobile device, a cellular phone, a personal digital assistant (PDA), and a personal messaging device (PMD).

3. The method of claim 1, wherein the content server is comprised from the group consisting of a broadcast station server, a corporate server, an audio server, a video server, an audio/video server, and a music server.

4. The method of claim 1, wherein the computer network is a network comprised from the group consisting of a TCP/IP-based network, a dedicated line network, a public network, a private network, a communications network, and a PSTN.

5. The method of claim 1, wherein the geographically restricted content is comprised from the group consisting of broadcast programming, audio programming, songs, video programming, datacast, and video presentations.

6. The method of claim 1, wherein delivering the requested geographically restricted content comprises streaming the requested geographically restricted content to the recipient device over the computer network until a connection between the recipient device and the content server is terminated.

7. The method of claim 1, wherein delivering the requested geographically restricted content comprises downloading the requested geographically restricted content to the recipient device over the computer network.

8. The method of claim 1, further comprising setting a flag indicating that the recipient device is authorized to receive the requested geographically restricted content over the computer network if the over-air signal acquisition information indicates that the recipient device is located in the geographically restricted area for the requested geographically restricted content.

9. The method of claim 1, wherein the over-air signal acquisition information is comprised of information based on over-air signal acquisition criteria.

10. The method of claim 9, further comprising selecting the over-air signal acquisition criteria based on the geographically restricted area for the requested geographically restricted content.

11. The method of claim 10, wherein the over-air signal acquisition criteria comprises information about one or more tuning frequencies for receiving one or more over-air signals indicative of the geographically restricted area for the requested geographically restricted content.

12. The method of claim 11, wherein selecting one or more tuning frequencies is performed by the content server.

13. The method of claim 11, wherein the over-air signal acquisition information is information received as a result of receiving the one or more over-air signals indicative of the geographically restricted area for the requested geographically restricted content.

14. The method of claim 11, wherein determining if the recipient device is located in the geographically restricted area, is comprised of determining if a tuner associated with the recipient device received the one or more over-air signals having broadcast areas indicative of the geographically restricted area for the requested geographically restricted content.

15. The method of claim 14, wherein the one or more over-air signals is comprised of one or more over-air broadcast signals, and the tuner is comprised from the group consisting of an AM radio tuner, a FM radio tuner, a UHF signal tuner, a VHF signal tuner, or a AM/FM radio tuner, or a UHF/VHF signal tuner, or a AM/FM/UHF/VHF tuner.

16. The method of claim 11, wherein the one or more over-air signals is comprised of one or more over-air radio broadcast signals, one or more over-air television broadcast signals, or a combination of one or more over-air radio and television broadcast signals.

17. The method of claim 10, further comprising:
generating the over-air signal acquisition criteria at the content server based on the geographically restricted area for the requested geographically restricted content; and
sending the over-air signal acquisition criteria over the computer network to the recipient device for determining the over-air signal acquisition information.

18. The method of claim 11, wherein the over-air signal acquisition information is extracted from the one or more over-air signals.

19. The method of claim 18, wherein the over-air signal acquisition information is comprised of over-air broadcast signal acquisition information comprising identifying information of a broadcast station that broadcasted the one or more over-air signals.

20. The method of claim 19, wherein the identifying information of the broadcast station is broadcast station call letters.

21. The method of claim 19, wherein the one or more over-air signals are comprised of one or more over-air broadcast signals and wherein the over-air broadcast signal acquisition information is embedded within the one or more over-air broadcast signals received by the recipient device.

22. The method of claim 21, wherein the over-air broadcast signal information embedded within the one or more over-air broadcast signals received by the recipient device is comprised of data comprised from the group consisting of RBDS data, SIS data, PSIP data, NAVE coding data, audio coding data, video coding data, analog data, and digital data.

23. The method of claim 1, further comprising determining if a user account has been previously established on the content server for the recipient device after the receiving a request for delivery of geographically restricted content from the recipient device over the computer network at the content server, and before the delivering the requested geographically restricted content to the recipient device over the computer network if the recipient device is located in the geographically restricted area for the geographically restricted content.

24. The method of claim 23, further comprising sending information to the recipient device over the computer network necessary for the recipient device to provide to the content server to establish the user account on the content server, if a user account has not been previously established on the content server for the recipient device.

25. The method of claim 24, further comprising receiving user account information from the recipient device over the computer network to establish the user account for the recipient device on the content server.

26. The method of claim 25, wherein the user account information is information comprised from the group consisting of a user id, a password, a name, an address, and billing account information.

27. The method of claim 1, further comprising establishing a connection between the content server and the recipient device before receiving the request for delivery of geographically restricted content from the recipient device over the computer network at the content server.

28. The method of claim 27, wherein the connection is a connection comprised from the group consisting of a web based services connection, and an API based services connection.

29. The method of claim 27, further comprising downloading an API software application to the recipient device, wherein establishing the connection further comprises the API software application establishing the connection between the content server and the recipient device.

30. The method of claim 1, further comprising:
receiving billing account information from the recipient device;
determining a billing address associated with the billing account information; and
determining if the billing address is located within the geographically restricted area for the requested geographically restricted content;
wherein the delivering the requested geographically restricted content comprises delivering the requested geographically restricted content to the recipient device over the computer network if:
the recipient device received the one or more over-air signals having broadcast areas indicative of the geographically restricted area for the requested geographically restricted content; and
the billing address is located within the geographically restricted area for the requested geographically restricted content.

31. The method of claim 30, wherein the determining if the billing address is located within the geographically restricted area for the requested geographically restricted content, comprises determining if a zip code associated with the billing address is for an area located within the geographically restricted area for the requested geographically restricted content.

32. The method of claim 30, further comprising charging a billing account associated with the billing account information for delivering the requested geographically restricted content to the recipient device over the computer network.

33. The method of claim 30, wherein the billing account information is comprised of account information comprised from the group consisting of credit card account information, debit card account information, and bank account information.

34. The method of claim 1, further comprising:
receiving GPS coordinates from the recipient device indicative of the recipient device's physical location; and
determining if the GPS coordinates indicate a location within the geographically restricted area for the requested geographically restricted content;

wherein the delivering the requested geographically restricted content comprises delivering the requested geographically restricted content to the recipient device over the computer network if
  the recipient device received the one or more over-air signals having broadcast areas indicative of the geographically restricted area for the requested geographically restricted content; and
  the GPS coordinates indicate a location within the geographically restricted area for the requested geographically restricted content.

35. The method of claim 1, further comprising:
receiving an IP address assigned to the recipient device;
accessing a database to determine an address associated with the IP address;
determining if the address associated with the IP address is located within the geographically restricted area for the requested geographically restricted content;
wherein the delivering the requested geographically restricted content comprises delivering the requested geographically restricted content to the recipient device over the computer network if:
  the recipient device received the one or more over-air signals having broadcast areas indicative of the geographically restricted area for the requested geographically restricted content; and
  the address associated with the IP address is located within the geographically restricted area for the requested geographically restricted content.

36. The method of claim 1, further comprising:
receiving billing account information from the recipient device; and
charging a billing account associated with the billing account information for delivering the requested geographically restricted content to the recipient device over the computer network.

37. The method of claim 1, further comprising:
accessing a database to determine an ANI associated with the recipient device;
determining if the physical address associated with the ANI is located within the geographically restricted area for the requested geographically restricted content;
wherein the delivering the requested geographically restricted content comprises delivering the requested geographically restricted content to the recipient device over the computer network if:
  the recipient device received the one or more over-air signals having broadcast areas indicative of the geographically restricted area for the requested geographically restricted content; and
  the address associated with ANI is located within the geographically restricted area for the requested geographically restricted content.

38. A system for delivering geographically restricted content over a computer network to a recipient device, comprising: a content server; the content server adapted to: receive a request for delivery of geographically restricted content from a recipient device over the computer network; continued receipt of over-air signal acquisition information from the recipient device indicative of whether the recipient device is located within a geographically restricted area for the requested geographically restricted content as a condition for continued delivery of the requested geographically restricted content; wherein the geographically restricted area is defined within a broadcast range of at least one broadcast antenna representative of an area where a recipient device is only permitted to receive the geographically restricted content; and wherein the received over-air signal acquisition information comprises a selectively tuned over-air signal containing embedded information to be extracted identifying a broadcast station indicative of a geographic area location of the recipient device; determine if the recipient device is located within the geographically restricted area for the requested geographically restricted content based on the received over-air signal acquisition information; and deliver the requested geographically restricted content to the recipient device over the computer network only if the recipient device is located within the geographically restricted area for the requested geographically restricted content.

39. The system of claim 38, wherein the recipient device is comprised from the group consisting of a personal computer, a network device, a television set top box, a mobile device, a personal digital assistant (PDA), and a personal message device (PMD).

40. The system of claim 38, wherein the content server is adapted to determine if the recipient device received one or more over-air signals, by determining if a tuner associated with the recipient device received the one or more over-air signals having broadcast areas indicative of the geographically restricted area for the requested geographically restricted content.

41. The system of claim 40, wherein the one or more over-air signals is comprised of one or more over-air broadcast signals, and wherein the tuner is comprised from the group consisting of an AM radio tuner, a FM radio tuner, a UHF signal tuner, a VHF signal tuner, or a AM/FM radio tuner, or a UHF/VHF signal tuner, or a AM/FM/UHF/VHF tuner.

42. The system of claim 38, wherein the content server is comprised from the group consisting of a broadcast station server, a corporate server, an audio server, a video server, an audio/video server, datacast, and a music server.

43. The system of claim 38, wherein the content server is further adapted to deliver the requested geographically restricted content comprises streaming the requested geographically restricted content to the recipient device over the computer network until a connection between the recipient device and the content server is terminated.

44. The system of claim 38, wherein the content server is adapted to deliver the requested geographically restricted content by downloading the requested geographically restricted content to the recipient device over the computer network.

45. The system of claim 38, wherein the over-air signal acquisition information is comprised of information based on over-air signal acquisition criteria.

46. The system of claim 45, wherein the content server is further adapted to select the over-air signal acquisition criteria based on the geographically restricted area for the requested geographically restricted content.

47. The system of claim 46, wherein the over-air signal acquisition criteria comprises information about one or more tuning frequencies for receiving one or more over-air signals indicative of the geographically restricted area for the requested geographically restricted content.

48. The system of claim 47, wherein the over-air signal acquisition information is information received as a result of receiving the one or more over-air signals indicative of the geographically restricted area for the requested geographically restricted content.

49. The system of claim 47, wherein the one or more over-air signals are signals comprised from the group consisting of one or more over-air radio broadcast signals, one or more over-air television broadcast signals, or a combination of over-air radio and television broadcast signals.

50. The system of claim 45, wherein the content server is further adapted to:
generating the over-air signal acquisition criteria at the content server based on the geographically restricted area for the requested geographically restricted content; and
sending the over-air signal acquisition criteria over the computer network to the recipient device for determining the over-air signal acquisition information.

51. The system of claim 48, wherein the over-air signal acquisition information is extracted from the one or more over-air signals.

52. The system of claim 51, wherein the over-air signal acquisition information is comprised of over-air broadcast signal information comprising identifying information of a broadcast station that broadcasted the one or more over-air signals.

53. The system of claim 52, wherein the identifying information of the broadcast station is the broadcast station call letters.

54. The system of claim 52, wherein the one or more over-air signals are comprised of one or more over-air broadcast signals, and wherein the over-air broadcast signal acquisition information is embedded within the one or more over-air broadcast signals received by the recipient device.

55. The system of claim 54, wherein the over-air broadcast signal acquisition information embedded within the one or more over-air broadcast signals received by the recipient device is comprised of data comprised from the group consisting of RBDS data, SIS data, PSIP data, NAVE coding data, audio coding data, video coding data, analog data, and digital data.

56. The system of claim 38, wherein the content server is further adapted to determine if a user account has been previously established on the content server for the recipient device after the content server receives a request for delivery of geographically restricted content from the recipient device over the computer network to a recipient device at a content server, and before the content server delivers the requested geographically restricted content to the recipient device over the computer network if the recipient device is located in the geographically restricted areas for the requested geographically restricted content.

57. The system of claim 56, wherein the content server is further adapted to send information to the recipient device over the computer network necessary for the recipient device to establish a user account on the content server, if the user account has not been previously established on the content server for the recipient device.

58. The system of claim 57, wherein the content server is further adapted to receive user account information from the recipient device over the computer network to establish the user account for the recipient device on the content server.

59. The system of claim 38, wherein the content server is further adapted to establish a connection between the content server and the recipient device before the content server receives the request for delivery of geographically restricted content from the recipient device over the computer network.

60. The system of claim 59, wherein the connection is a connection comprised from the group consisting of a web based services connection, and an API based services connection.

61. The system of claim 59, wherein the content server is further adapted to download an API software application to the recipient device, wherein the content server is further adapted to establish the connection between the content server and the recipient device by receiving a connection request from the API software application at the recipient device.

62. The system of claim 38, wherein the content server is further adapted to:
receive billing account information from the recipient device;
determine a billing address associated with the billing account information; and
determine if the billing address is located within the geographically restricted area for the requested geographically restricted content;
wherein the content server is further adapted to deliver the requested geographically restricted content comprises delivering the requested geographically restricted content to the recipient device over the computer network if the content server determines that:
the recipient device received the one or more over-air signals having broadcast areas indicative of the geographically restricted area for the requested geographically restricted content; and
the billing address is located within the geographically restricted area for the requested geographically restricted content.

63. The system of claim 62, wherein the content server is adapted to determine if the billing address is located within the geographically restricted area for the requested geographically restricted content, by determining if a zip code associated with the billing address is for an area located within the geographically restricted area for the requested geographically restricted content.

64. The system of claim 62, wherein the content server is further adapted to charge a billing account associated with the billing account information when the content server delivers the requested geographically restricted content to the recipient device over the computer network.

65. The system of claim 38, wherein the content server is further adapted to:
receive GPS coordinates from the recipient device indicative of the recipient device's physical location;
determine if the GPS coordinates indicate a location within the geographically restricted area for the requested geographically restricted content;
wherein the content server is further adapted to deliver the requested geographically restricted content comprises delivering the requested geographically restricted content to the recipient device over the computer network if the content server determines that:
the recipient device received the one or more over-air signals having broadcast areas indicative of the geographically restricted area for the requested geographically restricted content; and
the GPS coordinates indicate a location within the geographically restricted area for the requested geographically restricted content.

66. The system of claim 38, wherein the content server is further adapted to:
receive an IP address assigned to the recipient device;
access a database to determine an address associated with the IP address;
determine if the address associated with the IP address is located within the geographically restricted area for the requested geographically restricted content;

wherein the content server is further adapted to deliver the requested geographically restricted content to the recipient device over the computer network if the content server determines that:
the recipient device received the one or more over-air signals having broadcast areas indicative of the geographically restricted area for the requested geographically restricted content; and
the address associated with the IP address is located within the geographically restricted area for the requested geographically restricted content.

67. The system of claim 38, wherein the content server is further adapted to:
receive billing account information from the recipient device; and
charge a billing account associated with the billing account information for delivering the requested geographically restricted content to the recipient device over the computer network.

68. The system of claim 38, wherein the content server is further adapted to:
access a database to determine an ANI associated with the recipient device;
determine if the physical address associated with the ANI is located within the geographically restricted area for the requested geographically restricted content;
wherein the content server is further adapted to deliver the requested geographically restricted content comprises delivering the requested geographically restricted content to the recipient device over the computer network if:
the recipient device received the one or more over-air signals having broadcast areas indicative of the geographically restricted area for the requested geographically restricted content; and
the address associated with ANI is located within the geographically restricted area for the requested geographically restricted content.

69. A method of delivering regulatory-based geographically restricted over-air broadcast programming from a broadcast station server over a computer network to a networked device in response to the broadcast station server receiving a request for the over-air broadcast programming from the networked device, comprising: receiving a request for delivery of geographically restricted over-air broadcast programming from a networked device over a computer network at a broadcast station server; continued receiving of over-air broadcast signal acquisition information from the networked device over the computer network indicative of whether a tuner associated with the networked device could receive one or more over-air broadcast signals having a broadcast area, indicative of whether the networked device is physically located within a geographically restricted area for the requested over-air broadcast programming as a condition for continued delivery of the requested over-air broadcast programming; wherein the geographically restricted area is defined within a broadcast range of at least one broadcast antenna representative of an area where a networked device is only permitted to receive the over-air broadcast programming; and where the received over-air broadcast signal acquisition information comprises a selectively tuned over-air signal containing embedded information to be extracted identifying a broadcast station indicative of a geographic area location of the recipient device; determining if the networked device is physically located within the geographically restricted area for the requested over-air broadcast programming based on the received over-air broadcast signal acquisition information; and delivering the requested over-air broadcast programming to the networked device over the computer network only if the networked device is physically located within the geographically restricted area for the over-air broadcast programming.

70. A network device for requesting geographically restricted content over a computer network from a content server, comprising: a network device; the network device adapted to: send a request for delivery of the geographically restricted content to the content server over the computer network; continued receipt of over-air signal acquisition information from a tuner coupled to the network device indicative of whether the network device is located within the geographically restricted area for the requested geographically restricted content as a condition for continued delivery of the requested geographically restricted content, wherein the geographically restricted area is defined within a broadcast range of at least one broadcast antenna representative of an area where a recipient device is only permitted to receive the geographically-restricted content; and wherein the received over-air signal acquisition information comprises a selectively tuned over-air-signal containing embedded information to be extracted identifying a broadcast station indicative of a geographic area location of the recipient device; send the received over-air signal acquisition information to the content server; and receive the requested geographically restricted content from the content server over the computer network only if the network device is located within the geographically restricted area for the requested geographically restricted content.

71. The method of claim 1, wherein the receiving over-air signal acquisition information is received from a signal comprised from the group consisting of an AM radio signal, a FM radio signal, a UHF signal, a VHF signal, an analog signal, a digital signal, a high definition (HD) signal, a HD radio signal, a HD television signal, a mobile phone signal, a broadband signal, and a WiMAX signal.

72. The system of claim 38, wherein the content server is further adapted to receive the over-air signal acquisition information from a signal comprised from the group consisting of an AM radio signal, a FM radio signal, a UHF signal, a VHF signal, an analog signal, a digital signal, a high definition (HD) signal, a HD radio signal, a HD television signal, a mobile phone signal, a broadband signal, and a WiMAX signal.

73. The method of claim 1, wherein the over-air signal is a global positioning system (GPS) signal.

74. The system of claim 38, wherein the over-air signal is a global positioning system (GPS) signal.

75. The system of claim 38, wherein the over-air signal is a plurality of global positioning system (GPS) signals.

* * * * *